(12) United States Patent
Goudy et al.

(10) Patent No.: US 12,085,292 B2
(45) Date of Patent: Sep. 10, 2024

(54) HUMIDIFIER SYSTEM AND METHODS FOR USING SAME

(71) Applicant: Dr. Noze Best, LLC, Atlanta, GA (US)

(72) Inventors: Steven L. Goudy, Atlanta, GA (US); Richard C. Reineke, Atlanta, GA (US); Nicholas Hummel, Atlanta, GA (US)

(73) Assignee: Dr. Noze Best, LLC, Atlanta, GA (US)

( * ) Notice: Subject to any disclaimer, the term of this patent is extended or adjusted under 35 U.S.C. 154(b) by 0 days.

(21) Appl. No.: 17/558,586

(22) Filed: Dec. 21, 2021

(65) Prior Publication Data

US 2022/0196270 A1 Jun. 23, 2022

Related U.S. Application Data

(60) Provisional application No. 63/128,480, filed on Dec. 21, 2020.

(51) Int. Cl.
*F24F 11/00* (2018.01)
*F24F 6/12* (2006.01)
(Continued)

(52) U.S. Cl.
CPC ............ *F24F 11/0008* (2013.01); *F24F 6/12* (2013.01); *F24F 2006/008* (2013.01); *F24F 2110/20* (2018.01); *G05D 22/02* (2013.01)

(58) Field of Classification Search
CPC .... F24F 11/0008; F24F 6/12; F24F 2006/008; F24F 2110/20; G05D 22/02
See application file for complete search history.

(56) References Cited

U.S. PATENT DOCUMENTS 5,677,982 A * 10/1997 Levine .................. F24F 6/00
392/405
6,027,030 A * 2/2000 Buijsse ............... B05B 7/2489
236/44 C
(Continued)

FOREIGN PATENT DOCUMENTS

| CN | 104390304 A | 3/2015 |
| EP | 1619451 B1 | 10/2007 |
| FR | 2544604 A3 | 10/1984 |

OTHER PUBLICATIONS

International Search Report and Written Opinion dated Mar. 21, 2022 cited in Application No. PCT/US21/64761, 21 pgs.

*Primary Examiner* — Stephen Hobson
(74) *Attorney, Agent, or Firm* — BEKIARES ELIEZER LLP

(57) ABSTRACT

Disclosed herein is a humidifier device and system for regulating a microclimate in a predefined microenvironment within a predefined area. The system including a humidifier device having a vapor source configured to produce water vapor or moisture, and an airflow source configured to produce airflow, a plurality of sensors, each sensor configured to measure absolute humidity data and/or temperature data; a control unit in operative communication with the humidity unit for controlling operation of the humidity unit; a specialized housing for containing the components; and a tank configured to removably couple with the housing. The system may employ sensors may located at different, predetermined positions and technology such as predictive analytics using positional data and sensed data from the various sensors for controlling humidity and regulating the microclimate. Also disclosed herein are methods for using the disclosed humidifier devices and system.

20 Claims, 10 Drawing Sheets

(51) Int. Cl.
*F24F 6/00* (2006.01)
*F24F 110/20* (2018.01)
*G05D 22/02* (2006.01)

(56) References Cited

U.S. PATENT DOCUMENTS

| | | | | |
|---|---|---|---|---|
| 6,427,984 | B1* | 8/2002 | Mulvaney | F24F 6/043 |
| | | | | 261/107 |
| 8,777,187 | B2* | 7/2014 | Wong | F24F 6/12 |
| | | | | 261/106 |
| 9,372,008 | B2* | 6/2016 | Kanel | F24F 6/02 |
| 9,429,334 | B2* | 8/2016 | Castillo | F24F 11/86 |
| 9,744,256 | B2* | 8/2017 | Gschwind | A61L 9/14 |
| 9,845,961 | B2* | 12/2017 | Saito | F24F 6/04 |
| 10,605,470 | B1* | 3/2020 | Saxena | G06V 10/84 |
| 10,729,876 | B2* | 8/2020 | Main | F24F 13/06 |
| 2006/0201506 | A1* | 9/2006 | Makinson | A61M 16/1075 |
| | | | | 128/204.22 |
| 2007/0043478 | A1* | 2/2007 | Ehlers | F24F 11/58 |
| | | | | 700/276 |
| 2009/0047005 | A1* | 2/2009 | Liao | H02K 11/33 |
| | | | | 388/811 |
| 2009/0242651 | A1* | 10/2009 | Ha | F24F 11/74 |
| | | | | 236/51 |
| 2010/0230503 | A1* | 9/2010 | Nakaguro | B60H 3/022 |
| | | | | 236/44 A |
| 2010/0316501 | A1* | 12/2010 | Bain | F04D 25/105 |
| | | | | 416/246 |
| 2011/0005794 | A1* | 1/2011 | Lee | C02F 1/4608 |
| | | | | 174/1 |
| 2011/0287705 | A1* | 11/2011 | Kamp | F24F 11/63 |
| | | | | 454/239 |
| 2016/0067368 | A1* | 3/2016 | Gschwind | A61L 9/14 |
| | | | | 239/4 |
| 2017/0000671 | A1* | 1/2017 | Lachenbruch | G16H 40/63 |
| 2018/0017278 | A1* | 1/2018 | Klein | F24F 11/62 |
| 2018/0017980 | A1* | 1/2018 | Halevi | F24F 6/025 |
| 2018/0094825 | A1* | 4/2018 | Peczalski | F24F 13/222 |
| 2018/0295783 | A1* | 10/2018 | Alexander | G01N 33/0098 |
| 2018/0321700 | A1* | 11/2018 | Kwak | G05D 23/1919 |
| 2019/0041075 | A1* | 2/2019 | Sarkar | F24F 11/62 |
| 2019/0107309 | A1* | 4/2019 | Assouad | G05D 23/1919 |
| 2019/0338975 | A1* | 11/2019 | Ray | F24F 11/72 |
| 2019/0353369 | A1* | 11/2019 | George | G05B 13/024 |
| 2020/0062076 | A1* | 2/2020 | Elson | B60H 1/00735 |
| 2020/0173673 | A1* | 6/2020 | Goel | F24F 6/04 |
| 2022/0007589 | A1* | 1/2022 | Binney | G06T 7/0012 |
| 2022/0043986 | A1* | 2/2022 | Nell | G10L 15/22 |
| 2022/0066405 | A1* | 3/2022 | Harvey | H04W 84/00 |
| 2023/0076004 | A1* | 3/2023 | Karp | F24F 6/14 |
| 2024/0019149 | A1* | 1/2024 | Berson | F24F 11/37 |

* cited by examiner

HUMIDIFIER SYSTEM AND METHODS FOR USING SAME

CROSS REFERENCE TO RELATED APPLICATIONS

This application claims the benefit of priority to U.S. Provisional Patent Application Ser. No. 63/128,480, filed Dec. 21, 2020, which is hereby incorporated herein by reference in its entirety.

FIELD OF INVENTION

The present invention relates to devices, systems, and methods for controlling humidity in a predefined area, such as a crib located in nursery.

BACKGROUND OF THE INVENTION

In various aspects, humidity can have a significant impact on child health. For example, humidity can be especially important during the winter months when there is a higher incidence of colds and drier indoor air due to use of heat. To that end, low humidity is associated with increased respiratory and skin infections while high humidity can lead to dust mites and mold. Furthermore, maintaining an ideal humidity level is particularly important for babies younger than one years old since they cannot breathe through their mouth. To help babies breathe, many parents buy humidifiers. However, current humidifiers have significant shortcomings that are not being currently addressed, including, but not limited to the ability to regulate a predefined area in a room, such as a crib, while minimizing mold growth from standing or pooled water associated with using the humidifier.

Accordingly, there remains a need for an improved humidifier device and system for a predefined area that easily allows an individual to install, deploy, and regulate humidity of a specific portion of a room, such as a crib in a nursery. Such a humidifier device and system would preferably comprise a removable, dishwasher-safe tank and comprise a design to eliminate or substantially eliminate mold growth associated with standing water or accumulated water within the humidifier. This need and other needs are satisfied by the various aspects of the present disclosure.

SUMMARY OF THE INVENTION

In accordance with the purposes of the invention, as embodied and broadly described herein, the invention, in one aspect, relates to a humidifier device and system, and methods of regulating humidity of a specific portion of a predefined area, such as a crib in a nursery. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In another exemplary aspect, the invention relates to a humidifier device comprising: a humidity unit comprising: a vapor source configured to produce water vapor or moisture, and an airflow source configured to produce airflow; a plurality of sensors, at least one sensor of the plurality of sensors configured to measure at least one of absolute humidity data or temperature data; a control unit in operative communication with the humidity unit for controlling operation of the humidity unit; a housing for containing the humidity unit, a plurality of sensors, and control unit; and a tank configured to removably couple with the housing, the tank configured to contain a fluid for producing moisture or water vapor; wherein the humidifier device is configured to produce humidified air using the moisture source and airflow source; wherein the humidified air is configured to control relative humidity in the predetermined portion, the humidified air configured to travel in a predetermined flow path along an output axis.

In another aspect, the invention related to a system for controlling a microclimate in a predefined microenvironment portion of a predefined space, the system comprising: a humidifier device comprising: a humidity unit comprising a vapor source configured to produce water vapor or moisture, and an airflow source configured to produce airflow, the humidity unit configured to produce humidified air, using the vapor source and airflow source, for controlling relative humidity in the predetermined portion, the humidified air configured to travel in a predetermined flow path along an output axis; a plurality of sensors, each sensor configured to measure absolute humidity data and/or temperature data; a control unit in operative communication with the humidity unit for controlling operation of the humidity unit; a housing for containing the humidity unit, a plurality of sensors, and control unit; and a tank configured to removably couple with the housing and configured to contain a fluid for producing moisture or water vapor.

In another aspect, the invention relates to a humidifier device comprising a vapor source configured to produce water vapor or moisture, an airflow source configured to produce airflow, a sensor array comprising a plurality of sensors; a control unit in operative communication with the humidity unit for controlling operation of the humidity unit; a housing for containing the device components; and a tank configured to removably couple with the housing, the tank configured to contain a fluid for producing moisture or water vapor.

In further aspects, the sensors may be located at different, predetermined positions along a shared plane corresponding to the output axis. In still further aspects, the humidifier device and system may be configured to produce humidified air using the vapor source and airflow source and to control relative humidity in the predetermined portion. To this end, the system and device may utilize various technologies in controlling and regulating a micro-climate in the predetermined target portion, including, but not limited to, artificial intelligence (AI), machine learning techniques, predictive modeling and/or various algorithms.

In further aspects, the invention also relates to methods for making and using the disclosed humidifier apparatuses, devices and systems, and kits comprising the disclosed apparatuses, devices, and systems.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate several aspects of the invention and together with the description, serve to explain the principles of the invention. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
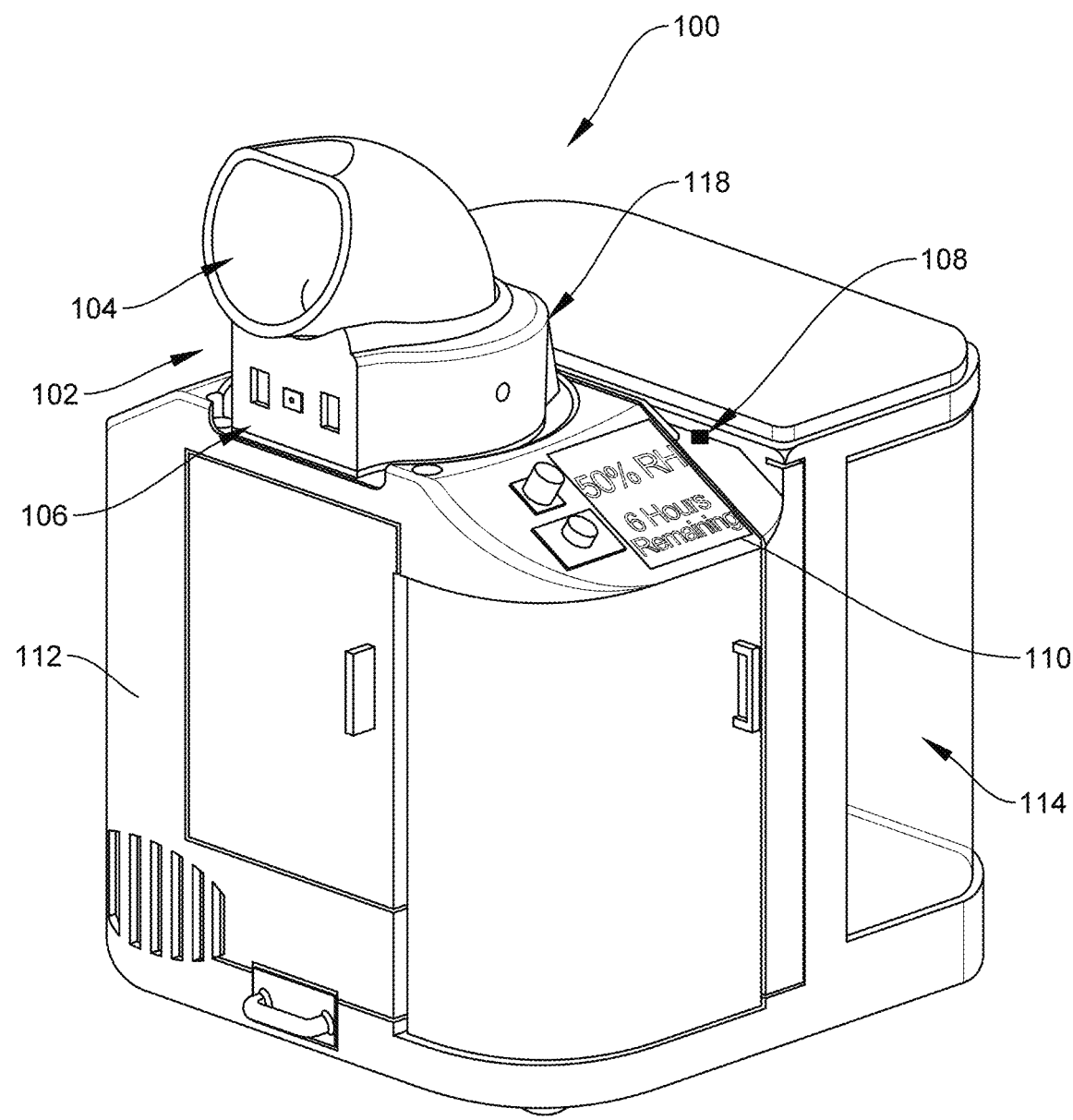
FIG. 1 shows a depiction of a humidifier device and system in accordance with an embodiment of the present disclosure.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, and as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this invention belongs. In this specification and in the claims, which follow, reference will be made to a number of terms which shall be defined herein.

As used in the specification and the appended claims, the singular forms "a," "an" and "the" include plural referents unless the context clearly dictates otherwise. Thus, for example, reference to "a leg" includes two or more legs.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Disclosed are the materials, components, parts, and/or elements to be used to manufacture the disclosed devices and systems of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutations of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

B. System Overview

As briefly described above, the present disclosure provides, in various aspects, a device and system for providing and/or controlling humidity in predefined areas. This overview is provided to introduce a selection of concepts in a simplified form that are further described below. This overview is not intended to identify key features or essential features of the claimed subject matter. Nor is this overview intended to be used to limit the claimed subject matter's scope.

In one aspect, the disclosed humidifier device and system can provide a convenient system that can be capable of being installed in a room to provide deployable humidity to create and regulate a micro-climate in a predefined microenvironment portion of the room, such as within a crib. The humidifier device and system can be easily installed and deployed by a single user for maintaining desired humidity levels. In further aspects, the invention can maintain an optimal relative humidity (RH) level in the air in the predefined area a fixed distance away from the humidifier device. For example, in some embodiments, the invention can be used in a baby's nursery to keep the crib microenvironment at a comfortable or prescribed humidity level. The present invention employs various technologies for controlling the micro-climate, including, but not limited to, artificial intelligence (AI), machine learning techniques, control strategies, predictive modeling and/or various algorithms. In some aspects, the present invention can combine closed loop control with the various technologies for estimating and controlling humidity level at the end user. In other aspects, the present invention can combine gas diffusion dynamics, knowledge of the distance to the target, and measurement of a room's ambient humidity by the sensors and filtering with a proportional integral controller with anti-windup consideration for estimating and controlling humidity level at the end user.

In various aspects, the invention is capable of atomizing water from a removable, dishwasher-safe tank and propelling it into the air using an air source, such as a fan, in a predetermined flow path in the direction of the target area. In some aspects, the output direction can be chosen by the user, for example, via a rotating output head. In other aspects, the output direction can be determined by the control unit, for example, by automatically adjusting output direction via a rotating output head. In still further aspects, the device may be capable of sensing, or otherwise determining, a relative humidity (RH) level at using humidity data or temperature data detected at one or more points corresponding to sensor positions of two or more sensors. For example, using a low pass filtered average of two sensors measurements as the value for a room's ambient relative humidity, steady state modeling with a fixed humidity density at the output of the vapor source, along with the fixed target distance, the device can estimate the RH level in the target area and adjust the rate of humidity output proportionately.

In further various aspects, the present invention addresses various shortcomings of many existing humidifiers which lack the ability to control the humidity at a specific point in a room. To this end, many existing humidifiers sense the humidity at one point on the machine and output water vapor until the whole room is at the target humidity, wasting water and energy, or only have the output rate adjustable, which can either lead to too little or too much humidity in the room. Furthermore, many existing humidifiers are difficult to clean and prone to mold buildup due to standing water or pooling water generated during operation. As disclosed herein, various embodiments of the present invention can address these shortcomings by one or more of the following: having a removable water tank that can be dishwasher safe, eliminating or substantially eliminating small unreachable crevasses in the device were water can pool or building, and implementing a control strategy of ejecting all liquid in the humidity unit as water vapor or transporting the liquid back into the tank for storage. In further aspects, the only standing water present in the device is in the tank, which can prevent mold from growing in the device components that the user cannot put in the dishwasher. Still further, various embodiments of the present invention can include a door or an accessible opening that the user can use to access the humidity unit, the vapor source, and/or internal portions, such as the transducer, actuator and/or output components in the housing for easier cleaning.

In various further aspects, the present disclosure provides a humidifier system comprising a humidity device comprising at least one humidity unit. The humidity unit may comprise a vapor source configured to produce water vapor or moisture, and an airflow source configured to produce airflow. The humidity unit may be configured to produce humidified air for controlling relative humidity in the predetermined portion of a room, for example, by regulating the vapor source and airflow source. The humidified air produced may be configured to travel in a predetermined flow path along an output axis towards a target point. In further aspect, the humidity device may comprise a plurality of sensors. At least one sensor may be configured to measure absolute humidity data and/or temperature data. In still further aspects, each sensor located at different, predetermined positions. In even further aspects, the humidity device may comprise a control unit in operative communication with the humidity unit for controlling operation of the humidity unit. In yet further aspects, the humidity device may include a housing for containing the device components, such as the humidifier unit, plurality of sensors, and control unit. In still further aspects, the humidity device may comprise a tank configured to removably couple with the housing. The tank may be configured to contain a fluid, such as water, for producing a mist, moisture or water vapor, or the like.

In one aspect, the present disclosure provides a humidifier device comprising a humidity unit comprising a vapor source configured to produce water vapor or moisture, an airflow source configured to produce airflow, a plurality of sensors, each sensor configured to measure absolute humidity data and/or temperature data, each sensor located at different, predetermined positions along a shared plane; a control unit in operative communication with the humidity unit for controlling operation of the humidity unit; a housing for containing the device components; and a tank configured to removably couple with the housing, the tank configured to contain a fluid for producing moisture or water vapor. In further aspects, the humidifier device may be configured to produce humidified air using the vapor source and airflow source; and to control relative humidity in the predetermined portion.

In further aspects, humidity device may further comprise at least one pump in fluid communication between the vapor source and the tank. The pump may be configured to move the fluid from the tank to the vapor source and from the vapor source to the tank. The pump may be configured to transport a predetermined amount of fluid to the vapor source. In still further aspects, the pump may be configured to transport a predetermined amount of fluid to the vapor source corresponding to the amount of desired water vapor production. In yet further aspects, the pump may be configured to transport excess fluid from the vapor source back to the tank. In yet further aspects, the pump may be configured to transport fluid from the vapor source back to the tank when the vapor source is off. The pump may be configured to remove standing fluid from the vapor source back to the tank when the vapor source is not producing water vapor. In some aspects, the pump is a peristaltic pump.

In further aspects, humidity device may further comprise at least one fluid level sensor (which may also be referred to herein as a water level sensor) configured to determine a volume of fluid in the vapor source. The fluid level sensor may be configured to determine if a sufficient volume of fluid is present in the vapor source effective to allow a predetermined volume of water vapor production. In still further aspects, the fluid level sensor and pump may cooperate to transport fluid between the vapor source and the tank. In yet further aspects, the fluid level sensor and pump may cooperate to transport fluid from the vapor source back to the tank when the vapor source is off or not producing water vapor. In even further aspects, the fluid level sensor and pump may cooperate to transport fluid from the vapor source back to the tank when the vapor source is off. In some aspects, the fluid level sensor may be configured to prevent the pump from overflowing the vapor source with fluid. In other aspects, the fluid level sensor may comprise a plurality of wire probes behind the transducer connected by a resistor ladder and a de-noising capacitor.

In further aspects, the humidity device may further comprise a tank switch configured to determine an installation status of the tank. The tank switch may comprise a pushbutton switch with a roller arm that is deflected upon full insertion of the tank into the machine.

In further aspects, various embodiments of the present invention may comprise vapor source or unit configured to produce water vapor or moisture. In still further aspects, the vapor source may be in fluid communication with fluid in the tank, which may contain water or other desired fluid. In yet further aspect, the vapor source may be configured to atomize the fluid from the tank. The vapor source may be configured to produce water vapor without requiring a standing pool of fluid.

In various aspects, the vapor source may comprise an actuator and/or transducer. The transducer may be configured to produce a fine mist from a fluid. The vapor source may comprise a transducer configured to produce a fine mist without a standing pool of fluid. To this end, the vapor source and a fluid source may be in separate locations, for example, such that a transducer is not required to remain in a pool of water in order to produce water vapor. In some aspects, the vapor source consists of a transducer configured to produce a fine mist without being submerged in a standing pool of fluid.

The vapor source may comprise a mesh transducer. The mesh transducer may comprise, such as, for example, a piezoelectric ceramic mesh disk or the like. The transducer or piezoelectric ceramic mesh disk may be capable of temporarily deforming in a direction when a voltage is placed across it. In some aspects, the piezoelectric ceramic mesh disk may comprise small holes configured to create fine droplets using the fluid from the tank. The small holes may be from about 1 to about 40 μm, for example, from about 1 to about 20 μm or from about 6 to about 15 μm, and including any subranges therebetween. The piezoelectric ceramic mesh disk may be configured to produce oscillations from sine wave input effective to cause droplets of the fluid to be propelled into the air. In further aspects, the actuator may utilize various output control mechanisms. In still further aspects, the actuator may use a variable amplitude, fixed frequency sine wave, variable frequency and/or variable duty cycle signals, which can be generated by many different circuit topologies. Instead of traditional cavitation transducer, which is placed a fixed distance under a standing pool of water, various embodiments of the present invention may employ mesh transducer configured to be placed between the fluid in the tank and the air outside. The foregoing vapor source arrangement may be effective to eliminate standing water anywhere in the machine except for the tank, which will prevent mold buildup in areas outside of the tank. In further aspects, various embodiments may comprise an airflow source or unit to carry or propel water vapor produced by the vapor source out of the housing. In still further aspects, the airflow source may be capable of propelling or moving water vapor at a predetermined velocity along a predetermined flow path. In yet further aspects, the airflow source may comprise a fan or the like, for example, a DC fan.

In further aspects, the device and system may comprise a plurality of sensors. In yet further aspects, the device and system may include a sensor array comprising a plurality of sensors. In even further aspects, each sensor may be configured to measure absolute humidity data and/or temperature data. In some aspects, two or more sensors may be located at different, predetermined positions, for example, along a shared plane. In other aspects, two or more sensors may be located at different, predetermined positions along a shared plane corresponding to the output axis. In further aspects, A sensor may be located a minimum distance from other sensors. In still further aspects, one or more sensors may be located or positioned behind the output location of the vapor source. In yet further aspects, one or more sensors may be located or positioned behind and above the output location of the vapor source. In yet further aspects, the plurality of sensors consists of two sensors located or positioned behind and above the output location of the vapor source.

In further aspects, the device and system may include additional sensors that are not located along the output axis, such as one or more remote sensor located within and/or outside the target portion (e.g., crib) of the area (e.g., room). In further aspects, the sensors may be configured to measure both humidity data and temperature data. The measured humidity data and temperature data may be used to determine a relative humidity (RH) level. The sensors may be in operable communication with the control unit. In further aspects, the system may be configured to sense a plurality of relative humidity levels at a plurality of points along the output axis. In various aspects, the system is configured to sense relative humidity levels at multiple different points in the area and/or along the output axis using multiple sensors. In some embodiments, the plurality of sensors may comprise a first sensor and a second sensor. In other embodiments, the plurality of sensors may comprise a first sensor and a second sensor, and a remote third or fourth sensor. In further aspects, the system may be configured to sense relative humidity levels at two different points along the output axis using the first and second sensors. In still further aspects, the system may be configured to sense relative humidity levels at two different points within and/or outside the target portion of the area using a remote third and/or fourth sensors. In even further aspects, the system and device controlling operation of the humidifier device may be based at least on absolute humidity data and/or temperature data from the plurality of sensors. The measured data, such as the humidity data and temperature data, may further comprise using a low pass filter. For example, the determined relative humidity (RH) level comprises an average of the measured humidity data and temperature data from the plurality of sensors.

In yet further aspects, the plurality of sensors can comprise at least one additional sensor selected from one or more of: a boost rail voltage sensor, transducer sine wave amplitude sensor, or fan current sensor, or combinations thereof. The boost rail voltage sensor may be configured to monitor the actual voltage at the output of the DC/DC boost converter. In some embodiments, a boost converter is operated in an open loop manner. The resistance on the bottom leg of the voltage divider of the reference pin on the boost converter IC may be controlled via a digital rheostat. By changing this resistance, it can be expected for the boost converter to change its output proportionally. In order to achieve tighter control of this boosted voltage, some embodiments may incorporate a voltage sensor at the boost rail and implement a form of feedback control. To this end, it is believed this would allow for more information about the vapor output, since the amount of water droplets ejected by the transducer is proportional to the amplitude of the AC waveform placed across the transducer's terminals. In further aspects, the transducer sine wave amplitude sensor maybe configured in parallel with the transducer to gain information about the waveform downstream of the resonant circuit. It is believed to be able to enable better knowledge about the amount of mist being ejected, which could be used to implement feedback control of the transducer. In yet further aspects, the fan current sensor may be incorporated for tighter control of the air flow source, (i.e., DC fan) responsible for establishing the airstream of the flow path of the humidified air.

In further aspects, the device further comprises a control unit in operative communication with the humidifier device or unit for controlling operation of the humidifier device or unit. The control unit may be in operative communication with the vapor source and/or airflow source for controlling operation of the vapor source and/or airflow source. Controlling operation of the vapor source and/or airflow source may be based at least on absolute humidity data and/or temperature data from the plurality of sensors.

In yet further aspects, the control unit may comprise or otherwise use at least one control strategy for operating the humidifier device or unit. The control strategy may comprise a low pass filtered average of the output data of plurality of sensors, for example, two sensor measurements as the value for the room's ambient relative humidity, and model in the steady state with a fixed humidity density at the output of the vapor source. To this end, it has been surprisingly discovered that with knowledge of the distance to the target point (i.e., a crib in a room), the control unit of the humidity device can control the ambient humidity of the target point using the dynamics of gas diffusion and the air source speed (i.e., fan speed) dictating the path of the vapor output. In further aspects, the output velocity of the air source output and/r the flow path of the water vapor output in the control strategy may be modeled as a parabolic arc. In even further aspects, the air source speed (i.e., fan speed) in the control strategy may be calculated or determined to ensure mist delivery to the proper target location.

In still further aspects, the control unit comprises a microcontroller, a DC/DC variable boost circuit, and/or an oscillator circuit for driving an actuator. The control unit may further comprise a user interface for communicating with and/or allowing a user to interact with the device. The user interface may comprise an LCD screen and/or any I/O devices, such as switches, buttons, or dials or the like, capable of communicating with the end user and/or controlling one or more function of the device.

In various aspect, the system and device may use various technologies in connection with performing different operational functions, including, but not limited to, artificial intelligence (AI), machine learning techniques, predictive modeling/analytics and/or various algorithms. For example, the system and device may use various algorithms, predictive analytics, AI and machine learning techniques to search the room for sensors and determine their location and/or distance relative to the machine and/or other sensors, such as integrated sensors in the housing. Still consistent with embodiments of the present disclosure, the system and device may receive data as it tracks and/or monitors the micro-climate (i.e., temperature, humidity, etc.) while controlling or regulating one or more microclimate of the microenvironment within the room. In further aspects, the system may be configured to use sensed RH values and a preprogrammed knowledge (e.g., user entered) or calculated knowledge (e.g., determined by the device) of the distance between two or more sensors along with a fixed target predetermined portion distance to estimate a RH level in the predetermined portion of a predefined space. For example, the system may be configured to use two sensed RH values and a preprogrammed knowledge of the distance between the first and second sensors positioned in the housing along with a fixed target distance (measured, estimated, or user provided) to estimate a RH level in the predetermined portion of the predefined space. The system may be configured to use the estimated RH level in the predetermined portion of the predefined space for controlling the humidity unit, for example, for controlling the rate of humidity output. In still further aspects, the system may be configured to use the estimated RH level in the predetermined portion of the predefined space for controlling humidity/moisture and/or airflow rate of the humidified air outputted from the humidity unit. In some embodiments, real-time sensed and calculated data may be combined with historical data, and/or biometric data, retrieved from remote sensors and/or wearables. The combination may then be used to identify microclimate characteristics and patterns within the microenvironment. Such characteristics and patterns may be identified by performing predictive analytics and/or machine learning over the historical data. In other embodiments, the system may construct a prediction model that may determine microclimate status and necessary adjustments to the microenvironment.

To this end, the system may be configured to allow use of water more efficiently, yielding a longer runtime for the same tank capacity, and able to avoid the negative effects of humidity levels being too high or too low, propensity to mold growth in the room and respiratory discomfort respectively.

In further aspects, the invention may comprise a housing for containing the various components, such as the vapor source, airflow source, plurality of sensors, and/or control unit. In some embodiments, the housing may comprise a rotating output head configured to control an output direction of the humidified air. The output direction of the humidified air may correspond to the output axis. The output head may be configured to be rotated about an axis by a user to control the output direction. In some aspects, the output head may have sensors configured to located in the same plane as the output axis. In yet further aspects, the housing may comprise an output shaft configured to carry the humidified air along the predetermined flow path. The output shaft may be connected to the output head, and may further include an access door for easy access. For example, in some aspects, the output shaft may comprise an access door on the front which can be opened so the output shaft can be accessed more easily for cleaning.

In further aspects, the device may further comprise at least one tank to contain a fluid for producing moisture or water vapor. The tank may be configured to removably couple with the housing. In still further aspects, tank may be removable and dishwasher safe. In yet further aspects, the tank does not comprise small, hard to reach, crevasses. In some aspects, the tank may be made from a non-opaque material, so that the user can visually verify the water level. Still further, the system may use a tank interfacing component configured to fix the tank in place such that no water leaks until the user removes it. To this end, the system may be configured to position the transducer within the tank on the boundary of the fluid and free air. Due to the different transducer being used and its different location requirements relative to the water in the tank (on the boundary of the water and the free air, as opposed to submerged under the water), the system is less likely to accumulate water or mold.

In various aspects, the device component characteristics and configuration, such as, for example, size and dimensions, can be configured to adjust for an intended area, individual user's characteristics, and other factors to achieve optimal humidity regulation. In further aspects, features of the device and components, such as the tank size and output connections, may be configured or utilized to set and/or control the micro climate characteristics. In further aspects, while the vapor source and/or airflow source described herein can be permanently mounted in or on the device housing or device structure, this is not a requirement. In still further aspects, one or more vapor sources and/or device elements can be detachably connected to the housing, e.g., to allow interchange and/or replacement of one or more elements. Such configurations allow users to select desired humidity level and room properties, e.g., for customization purposes, for personal preferences, to match desired treatment use, a subject's physical characteristics, a subject's symptoms, or to repair or replace defective or damaged device component, etc.

In further aspects, the disclosed humidifier devices and systems may further comprise one or more of the following components: a voltage regulator, power switch, power management module, antenna (e.g., Bluetooth LE antenna), transceiver (e.g., Bluetooth LE transceiver), motor controller, interface module, control module, voltage sensor, current sensor, pulse-width modulation (PWM) module, power input, magnetic switch, motor control module (e.g., actuator control module), and motor drive. In still further aspects, a number of internal components may be mounted within an interior portion of the device and/or housing. For example, in some embodiments, the device may have an internal component configuration further comprising a controller containing a processing unit, battery back, voltage regulator, power switch, battery management module (e.g., fuel gauge), antenna (e.g., Bluetooth LE antenna), and transceiver (e.g., Bluetooth LE transceiver). In still further aspects, the device may further comprise a sanitizing or disinfecting module. The module may be configured to emit electro-optical (EO) radiation into the interior of the housing, tank, and or vapor source. The EO radiation or "sanitizing EO radiation" refers to any suitable wavelength and/or type of EO radiation capable of sanitizing a surface, such radiation may include, but is not limited to: type-C ultraviolet radiation (UV-C) comprising wavelengths between 280-100 nm, type B ultraviolet radiation (e.g. UV-B), middle ultraviolet radiation (MUV), far ultraviolet radiation (FUV), ionizing EO radiation, non-ionizing EO radiation, a combination of wavelengths and/or EO radiation types, or the like.

In further aspects, the disclosed devices may comprise one or more vapor sources and/or airflow sources that can be selectively operable to treat the air humidity. In even further aspects, the GUI may provide at least ones of: a graphic image of the predefined area to indicate where (and/or other characteristics of humidity and/or temperature) the vapor source and/or airflow source are delivering to the area at the time of operation, and telemetry data received from the sensors in the device.

In various aspects, the components of the disclosed system and components can be detachably attached. In further aspects, the components can be connected by a connecting means. In still further aspects, the connecting means can comprise a fitting, insert, adhesive, brazing, soldering, welding, spot weld, screw with nut, rivet, threading, friction fit, snap-fit, twist-lock, or interlocking mechanism or a combination thereof. In yet further aspects, the connection can be achieved using a snap, friction fitting, snap ring, O-ring, pressure fitting, clip, clasp, and the like. The snap ring or O-ring can be retained within a groove to accommodate the snap ring or O-ring. In a further aspect, the system can comprise an engagement means for coupling and holding components together. In a further aspect, the engagement means can be a screwing mechanism, a click-lock mechanism, or friction mechanism, or the like. In still further aspects, the system components can be integrally or mechanically attached to other components. In a yet further aspect, the disclosed components can be connected, attached, or mounted using a connecting means, the connecting means comprising a fitting, insert, adhesive, brazing, soldering, welding, spot weld, screw with nut, rivet, fitting, insert, threading, friction fit, or snap-fit or a combination thereof. In further aspects, the system may comprise one or more locking or securing mechanisms configured to releasably secure the tank, and/or other components in a desired state or position.

C. System Configuration

According to various aspects of the invention, the humidifier, devices and systems of the present disclosure can comprise multiple configurations. In the various embodiments, the invention may comprise one or more of the following components and features:

Humidity Unit: Vapor Source and Air Source

Actuator for emitting water vapor into air at a variable velocity; Transducer Disk capable of temporarily deforming in direction when a voltage is placed across it; Small (6-15 um) holes in the center to create fine water droplets; Oscillations from a periodic oscillating wave or signal, such as, from a sine, square or sawtooth or like wave input effective to cause water droplets to be propelled into the air DC Fan configured to create airflow at variable rate; configured to propel water vapor out of machine at higher velocity than the transducer would be able to generate on its own;

Sensors: 2 or more relative humidity sensors that sense temperature and absolute humidity to calculate RH; determine humidity at remote and/or fixed positions on the machine; configured to communicate with control unit, for example, to communicate with a microcontroller via wired or wireless serial or parallel communication protocol.

Housing: component that holds the actuator, sensors, electronics and has an interface to mate with the tank; tank interface fixes the tank in place, such that no water leaks, until the user removes it; Housing can have an access door on the front which can be opened so the output shaft can be accessed more easily for cleaning; Mating interface between the tank and housing can allow use of the mesh transducer.

Tank: Removable and dishwasher safe with no small, hard to reach, crevasses; Can be made from a non-opaque material, so that the user can visually verify the water level; when inserting the tank, it may be constrained by a slot, such that it is only free to translate in one direction and cannot rotate about any axis.

Control Unit and electronics: May include a microcontroller, DC/DC variable boost circuit, and oscillator circuit that drives the actuator; generates driving waveform for actuator; compiles sensor data and calculates output rate; microcontroller may take the sensor inputs via an electronic communication protocol and computes the appropriate output rate of water vapor; actuator may be controlled by altering the amplitude of a constant frequency sine wave put across the terminals of the transducer; signal's amplitude may be a function of the output voltage on the DC/DC boost converter; boost converter's output may be controlled by a digital potentiometer, which may interface with the microcontroller; microcontroller may also interface with LCD screen and user input devices (button & dial). User Interface: may include LCD screen and any I/O devices meant to communicate with the end user (i.e., buttons, dials, etc.)

In various further aspects, FIGS. 1-12B illustrate non-limiting examples of embodiments of operating environments, mechanisms, and components for the disclosed humidifier devices and systems. Although the operating environments, mechanisms, and components are disclosed with specific functionality, it should be understood that functionality may be shared between mechanisms and/or components, with some functions split between mechanisms and/or components, while other functions duplicated by the mechanisms and/or components. Furthermore, the name of the mechanisms and/or components should not be construed as limiting upon the functionality of the mechanisms and/or components. Moreover, each stage in a method or claim language can be considered independently without the context of the other stages. Each stage may contain language defined in other portions of this specifications. Each stage disclosed for one mechanism and/or component may be mixed with the operational stages of another mechanism and/or component. Each stage can be claimed on its own and/or interchangeably with other stages of other mechanisms and/or components.

In accordance with the present invention. FIGS. 1-8 show an embodiment of a humidifier device 100 for regulating humidity in a predefined target microenvironment comprising a portion of a predefined area, such as a crib located in a room. Humidifier device 100 comprises humidity unit 102 including vapor source 104 configured to produce mist, water vapor or moisture source, and airflow source 106 configured to produce airflow. The vapor source is configured with a transducer that generates tiny water droplets, a fan to produce airflow for moving the water droplets. The humidifier device includes two sensors 108, each sensor configured to measure absolute humidity data or temperature data. Control unit 110, which may include and LCD and/or manual buttons, in operative communication with the humidity unit for controlling operation of the humidity unit and/or providing device operation conditions and status information.

The device components are contained within a specialized housing 112 configured to detachably couple with a removable tank 114 that holds the fluid used to produce the water moisture or water vapor and humidified air. In further aspects, a tank switch may be present to provide installation status information about the tank, such as to provide or use in connection with operating the device and transporting fluid. In some embodiments, the tank switch may comprise a pushbutton switch with a roller arm that is deflected upon full insertion of the tank into the housing.

In further aspects, humidifier device 100 is configured to produce humidified air using the vapor source and airflow source; wherein the humidified air is configured to control relative humidity in the predetermined target microenvironment. As discussed further, the humidified air configured to travel in a predetermined flow path 116 along an output axis 118, which the user may direct toward the target location.

Figure 2:
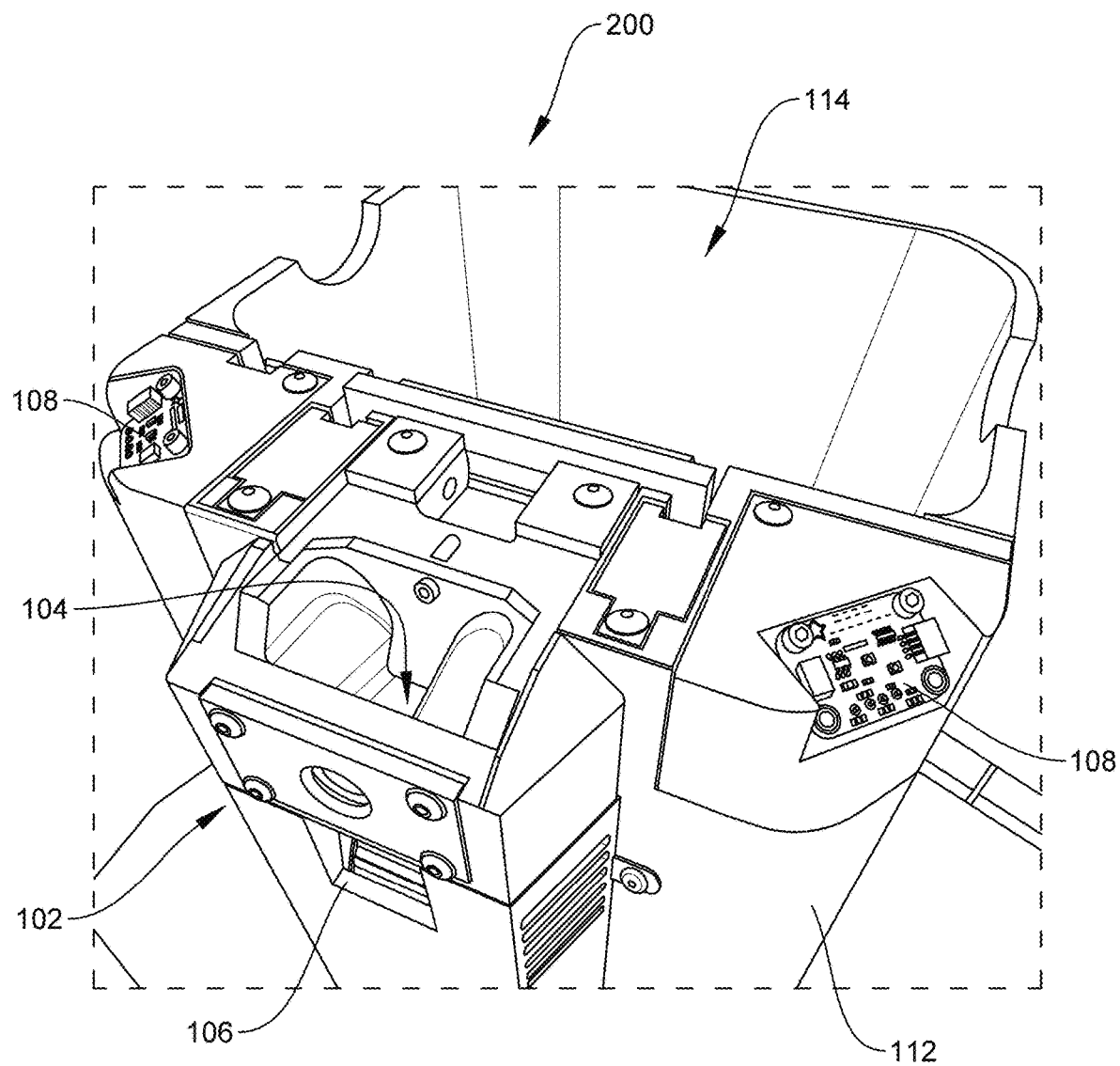
FIG. 2 shows a depiction of a humidity unit of a humidifier device and system in accordance with an embodiment of the present disclosure.
Figure 3:
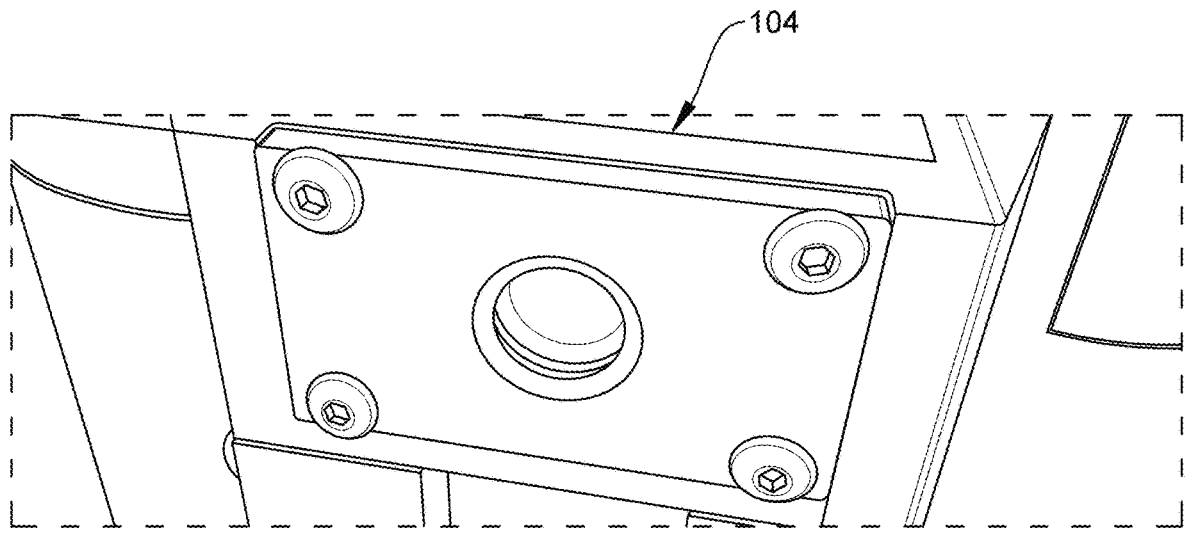
FIG. 3 shows a depiction of a vapor source of a humidifier device and system in accordance with an embodiment of the present disclosure.
Figure 4:
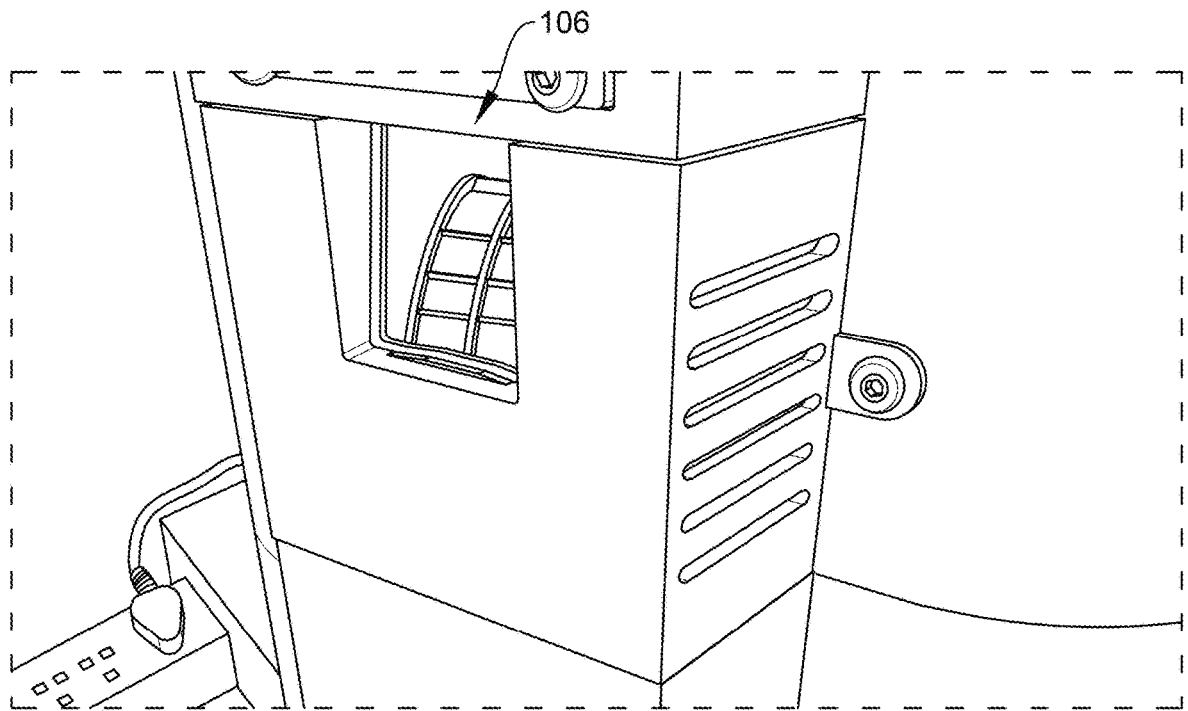
FIG. 4 shows a depiction of an airflow source of a humidifier device and system in accordance with an embodiment of the present disclosure.
Figure 5:
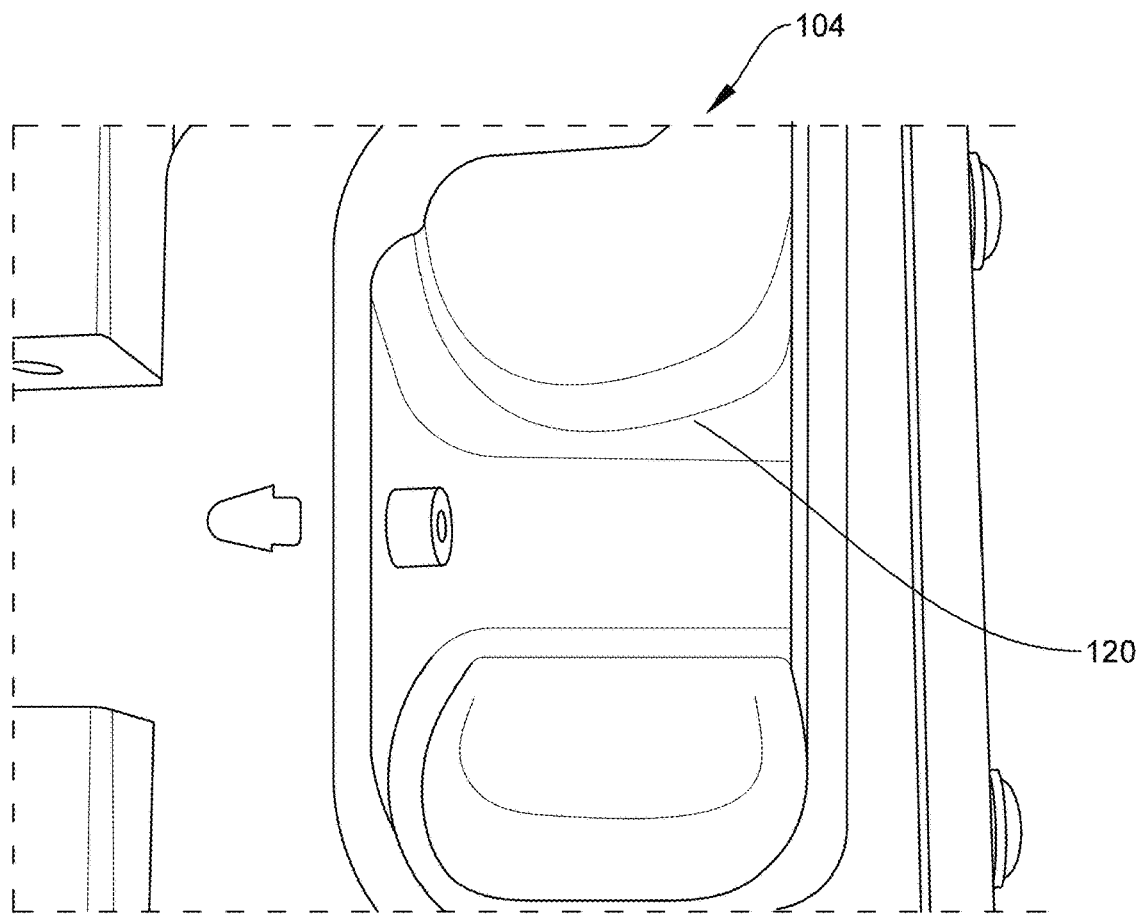
FIG. 5 shows a depiction of a vapor source of a humidifier device and system in accordance with an embodiment of the present disclosure.
Figure 6:
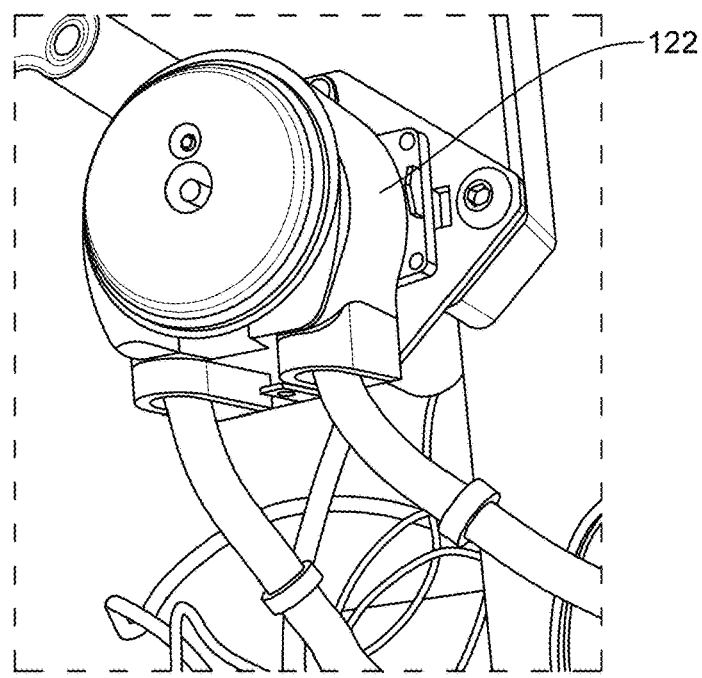
FIG. 6 shows a depiction of a pump of a humidifier device and system in accordance with an embodiment of the present disclosure.

As shown in FIG. 2, humidifier device 100 includes two relative humidity (RH) sensors 108 configured to sense both absolute humidity and temperature. Sensors 108 observe the relative humidity at two points on humidifier device 100 and are used for calculating and controlling the humidity at a point not on the machine with information only from the humidifier device 100. As described herein, one problem with existing humidifiers is their inability to regulate a predefined portion of a room, such as a crib in a nursery. Rather, these products sense the humidity at one point on the machine and output water vapor until the whole room is at the target humidity, wasting water and energy. To this end, these existing products do not create an optimal microclimate in the specific target area. In contrast, the inventive configuration and combination of elements of the present invention allow for the creation of microclimates within the target area. To this end, the humidifier device 100 generally uses sensed RH values and a preprogrammed knowledge of the distance between the two sensors along to estimate a RH level in the predetermined portion of a predefined space, and use the estimated RH level in the predetermined portion of the predefined space for controlling the humidifier device, for example, to control the amount of vapor/moisture and/or airflow rate of the humidified air outputted from the humidifier unit. It was found that the size of humidifier device 100 was too small to effectively measure a gradient of humidity across a room. This shortcoming was investigated and believed to be caused by 3 main factors: sensors were too close together, the data from the sensors being too noisy, and the assumption of a uniform humidity distribution (which was found to be inaccurate for scenarios when a net airflow was present in the room). According to some embodiments, humidifier device 100 utilizes an average of the two sensors as a measurement for the ambient relative humidity. By averaging the sensors and low pass filtering the signal, it was surprisingly discovered that the sensors can be placed behind the vapor source and air source to provide sensed data than can be used to determine a very close approximation to the ambient relative humidity of the target location.

Figure 7:
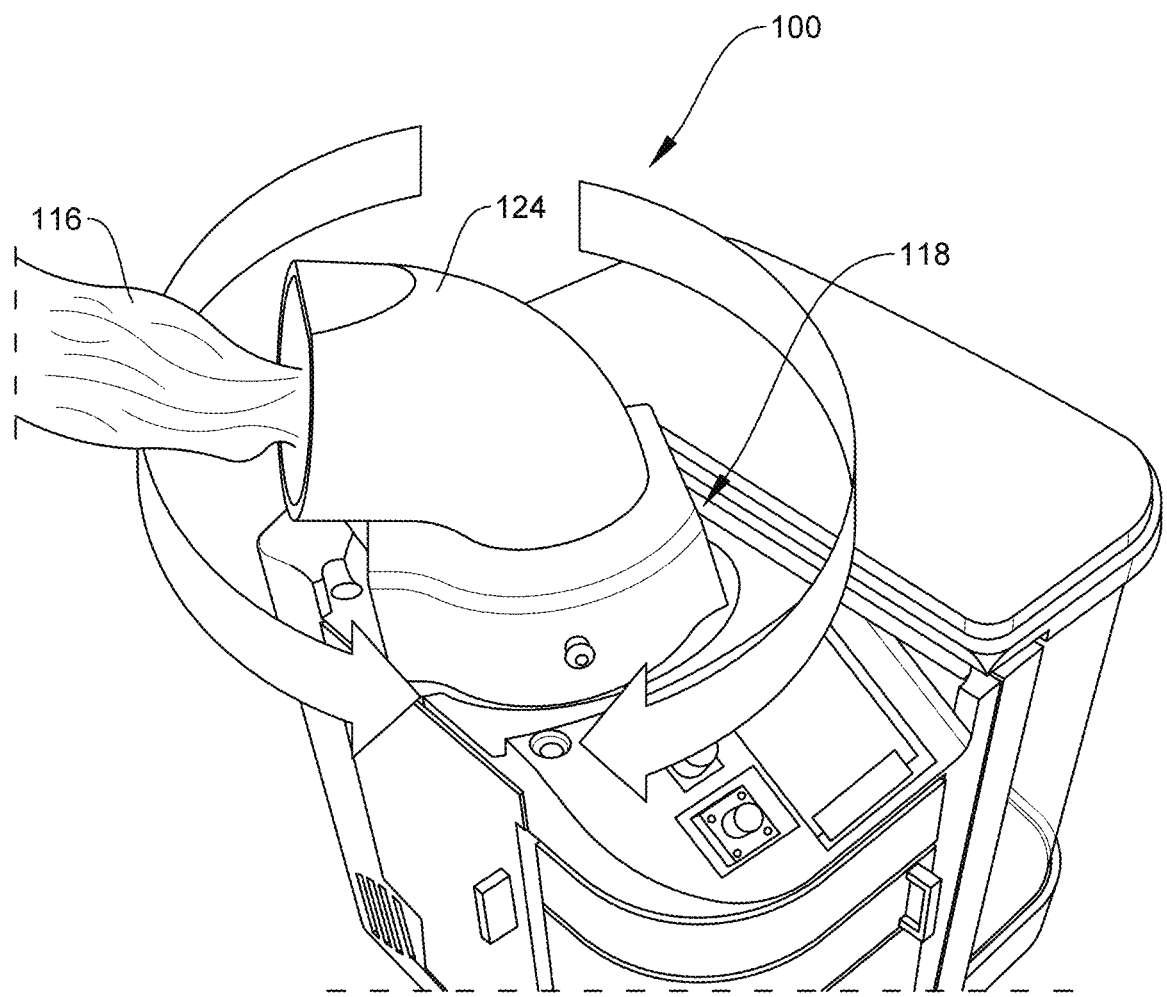
FIG. 7 show a depiction of a humidifier device and system in accordance with an embodiment of the present disclosure.

In further aspects, humidifier device 100 generally produces humidified air using the water droplets atomized by an actuator contained within vapor source 104 which are carried by the airflow produced by the fan of airflow source 106. The primary actuator is mesh transducer, specifically a piezoelectric ceramic mesh disk with small (6-15 um) holes configured to create fine droplets using the fluid transported from tank 114. More specifically, the piezoelectric ceramic mesh disk produces oscillations from oscillating wave input effective to cause droplets of the fluid to be propelled into the air. The transducer uses a variable amplitude, fixed frequency sine wave, which can be generated by many different circuit topologies.

The most common type of actuator is referred to as a cavitation transducer, which vibrates under a standing pool of water to eject fine particles from the pool's surface. As shown in FIGS. 3 and 5, and in contrast to traditional cavitation transducers which are placed a fixed distance under a standing pool of water, the mesh transducer used in the present embodiment is placed between the fluid in the tank and the air outside. However, by having an array of small holes in the transducer, the mesh transducer is able to achieve the same effect without a standing pool of water above it, which allows access and cleanability of the device. Further, such a vapor production arrangement can eliminate standing water in the machine to prevent mold buildup outside of the tank. Water from the tank may be fed to one side of the transducer with the other side open to free air, with a water tight seal around the perimeter of the transducer. As shown in FIG. 3, airflow source 106 comprises a second actuator in the form of a DC fan configured to establish an airstream flow path to the target location point for humidity delivery (i.e., a baby's crib in a room). Applicant discovered that the transducer itself was only able to eject water vapor a short distance, which is solved by the addition of a secondary actuator to carry the water droplets to their intended delivery point.

As shown in FIG. 6, humidifier device 100 further comprises pump 122 in fluid communication between vapor source 104 and tank 114. It was discovered that once the mesh transducer had been run and the surface tension of the water behind the transducer had been broken, water would leak through the holes in the mesh. However, if the head height of the water behind the transducer was low enough, leaking would be prevented. To achieve this functionality, pump 122 to move the water from the tank to the transducer. Pump 122 may be configured to move the fluid from the tank to the vapor source and from the vapor source to the tank. Pump 122 may be configured to transport a predetermined amount of fluid to the vapor source, which may correspond to the amount of vapor production needed to reach a humidity level at the target location. To maintain cleanability (i.e., no standing water in the device except for the tank), the humidifier device includes a control strategy of ejecting all water in the vapor source to either the transducer to be ejected as mist or pumped back into the tank. In other embodiments, pump may be configured to transport a predetermined amount of fluid to the vapor source corresponding to the amount of desired water vapor production and/or transport excess fluid from the vapor source back to the tank. That is, the pump may be configured to transport fluid from the vapor source back to the tank when the vapor source is off or when the vapor source is not producing water vapor.

As shown in FIG. 5, vapor source further comprises fluid level sensor 120 configured to determine a sufficient amount of water is present at the transducer level without overflowing, such as when the pump is transporting water from the tank to the transducer. Fluid level sensor 120 includes a series of wire probes behind the transducer connected by a resistor ladder and a de-noising capacitor. The voltage at the top of the transducer wire is placed on a GPIO pin of the microcontroller to pulse a 3V signal. The middle of the ladder is attached to an analog input of the microcontroller. When water connected the wire probes, the observed voltage at the analog input would drop, signaling water at the correct level.

Another problem with existing humidifiers is mold accumulation due to their housing and tank designs, which make parts difficult to reach. As described herein, the various embodiments of the present invention are easily disassembled and assembled, enabling user to access to all or substantially all areas inside the housing where water or water vapor may be present for streamlined cleaning and maintenance. Furthermore, all or substantially all of the parts may be dishwasher safe. In various embodiments, a specialized housing according to the present invention generally can contain all device components together, can be opened so the interior can be easily cleaned, and can interface with the removable tank in such a way that no water leaks between components and the water from the tank is supplied to the transducer until the tank is empty. As shown in FIG. 7, humidifier device 100 may further rotatable output head 124 located at to carry the humidified air along the air flow path 116.

As shown in FIG. 7, specialized housing 114 in this embodiment can have a rotating output head 118 that can control the output direction of the humidified air flow path 116, which can be rotated about the output axis 118 by the user to control the output direction. In some embodiments, the output head can include extension tubing and components to cover the target area. For example, the device may include a covering to fit over the open top of a crib to create a closed microenvironment within the three-dimensional volume of a crib.

Figure 8:
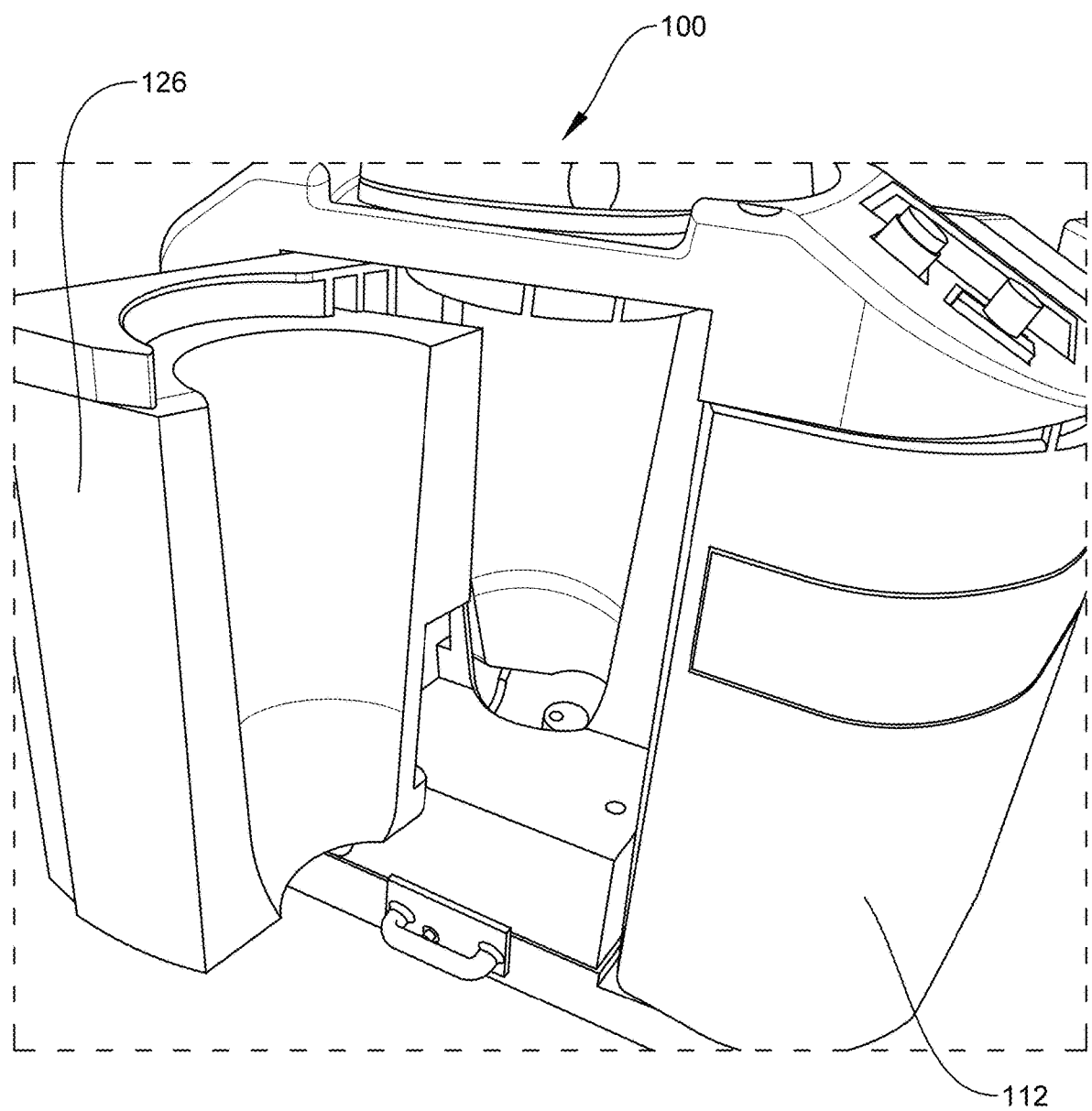
FIG. 8 shows a depiction of an access door of a humidifier device and system in accordance with an embodiment of the present disclosure.

As shown in FIG. 8, specialized housing 114 in this embodiment can include an access door 126 which can be opened so the internal humidity unit areas can be accessed more easily for cleaning. In various aspects, the tank, which is removable and dishwasher safe, does not comprise small, hard to reach, crevasses and is preferably made from a non-opaque material so that the user can visually verify the water level. In further aspects, the specialized mating interface between the tank and housing allow use of the mesh transducer and vapor production arrangement due to location of transducer relative to the water in the tank, i.e., within the tank on a boundary of the fluid and free air. as opposed to submerged under the water.

Figure 9A:
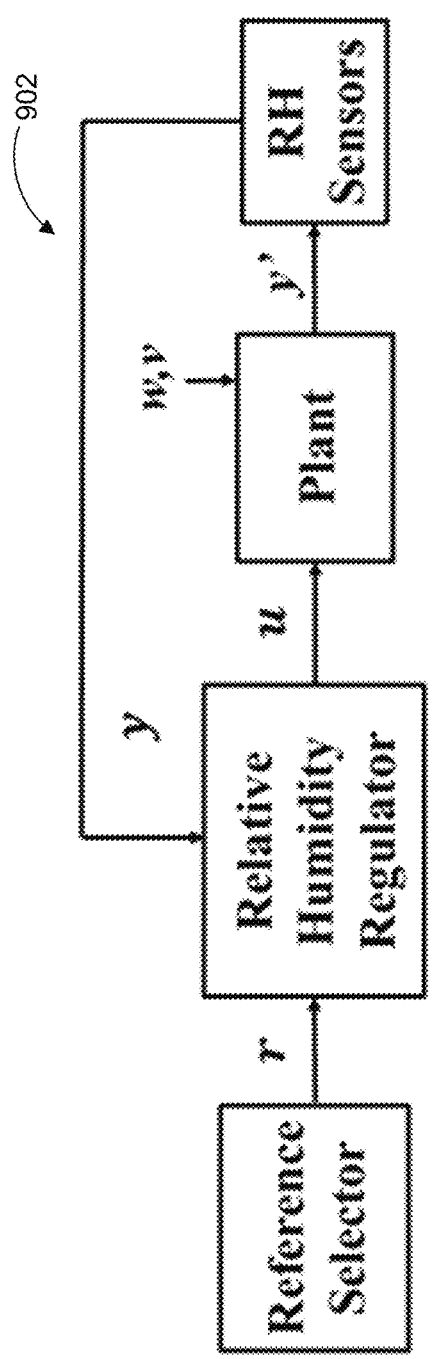
FIGS. 9A-9B show diagrams for regulating humidity in a humidifier device and system in accordance with another embodiment of the present disclosure.
Figure 9B:
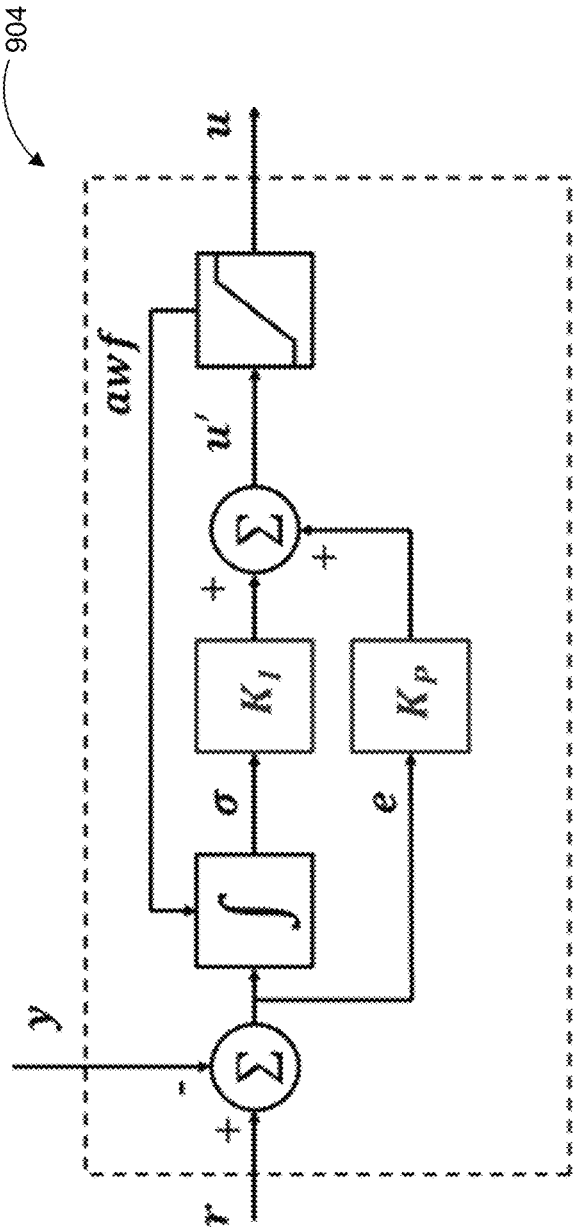
Figure 10:
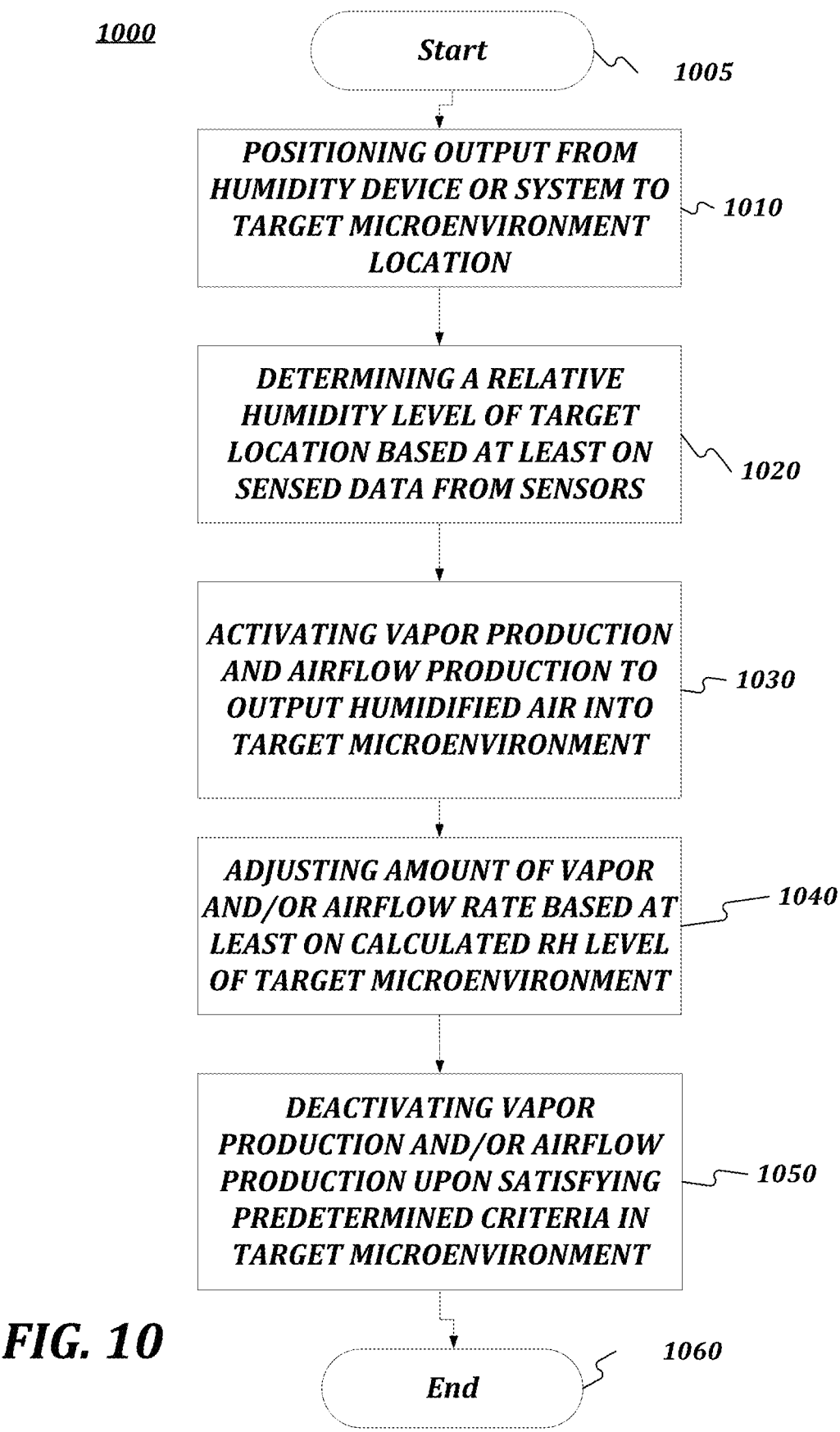
FIG. 10 is a flow chart of a method for regulating humidity using a disclosed humidifier system in accordance with an embodiment of the present disclosure.

As described herein, the humidifier device 100 comprises a control unit 110 with a microcontroller, in operative communication with the humidifier unit 102 for controlling operation of the vapor source and airflow source. Controlling operation of the vapor source and/or airflow source may be based at least on absolute humidity data and/or temperature data from sensors 108. Control unit may use a control strategy for operating the humidifier unit. The control strategy comprises a low pass filtered average of the output data of sensors 108, for example, two sensor measurements as the value for the room's ambient relative humidity, and model in the steady state with a fixed humidity density at the output of the vapor source. To this end, it has been surprisingly discovered that with knowledge of the distance to the target point (i.e., a crib in a room), the control unit of the humidity device can control the ambient humidity of the target point using the dynamics of gas diffusion and the air source speed (i.e., fan speed) dictating the path of the vapor output. In further aspects, the output velocity of the air source output and/r the flow path of the water vapor output in the control strategy may be modeled as a parabolic arc. In even further aspects, the air source speed (i.e., fan speed) in the control strategy may be calculated or determined to ensure mist delivery to the proper target location. To this end, control unit 110 includes a proportional integral controller with anti-windup consideration. FIG. 9A is a block diagram of the complete controller and the regulator that determines the requested output of the transducer, and FIG. 9B is a block diagram of the relative humidity regulator:

Plant: the target location, and describing dynamics model what happens to the room when mist is ejected into it by the device 100.

r: reference command—the desired ambient relative humidity of the room, which is dictated by the distance from the device 100 to the target point (this calculation is done in the reference selector).

y': plant output—actual relative humidity at the machine.

y: measured plant output—measured relative humidity from the machine after low pass filtering.

u: actuator input—mist being ejected into the room.

w: disturbances to the system—anything not accounted for in the first order approximation of the diffusion dynamics (e.g., air flowing in from a vent, someone walking in front of the device).

v: sensor noise—inaccuracies from sensor non-idealities.

σ: error integrator—this is the cumulative error over time; adding the integral term can ensure zero steady state error.

e: error between the reference command and plant output u': actuator request—requested amount of mist u: actual actuator input—saturated because the transducer can only output between 0 and 100% (e.g., if request was for 200% or −10% power the actual input would be saturated to 100% and 0% respectively).

awf: anti-windup flag—This stops the error integrator from increasing when the actuator is saturated.

D. System Operation and Methods for Use and Make

Also disclosed herein are methods of using a disclosed humidifier device and system. For example, in another exemplary aspect, the present disclosure provides a method of humidifying a portion of a predefined space using a disclosed device and system. In further aspects, the predefined space may be a nursery, a crib or the like. In one aspect, the disclosed method can comprise one or more of the following steps: positioning output from the humidity device or system of any preceding claim into the predefined target portion; determining a relative humidity level of the target portion based at least on sensed humidity data and/or temperature data from the plurality of sensors; activating vapor production from the vapor source with airflow production from the airflow source to output humidified air into the target portion; adjusting the vapor amount from the vapor source and/or airflow rate from airflow based at least on the relative humidity level of the target portion; and deactivating vapor production from the vapor source and/or airflow production from the airflow source upon satisfying predetermined humidity criteria in the target portion. The relative humidity level of the target portion may be determined based at least on two or more sensed RH values and a preprogrammed or system-determined knowledge of the distance between first and second sensors along with a fixed target distance to the predefined target portion. Such knowledge may be determined by the system using artificial intelligence (AI), machine learning techniques, predictive modeling and/or algorithms. In some embodiments, the system may utilize remote sensor located in and around the target microenvironment, such as located within or positioned at the outer boundaries. To this end, the system may measure and/or determine various distances, such as distances between sensors, the humidifying unit, and the target microenvironment, using positional data, such as from wireless feedback or the like. In further aspects, the remote sensors may be used define the boundaries of target microenvironment, for example, to adjust target output.

Figure 11:
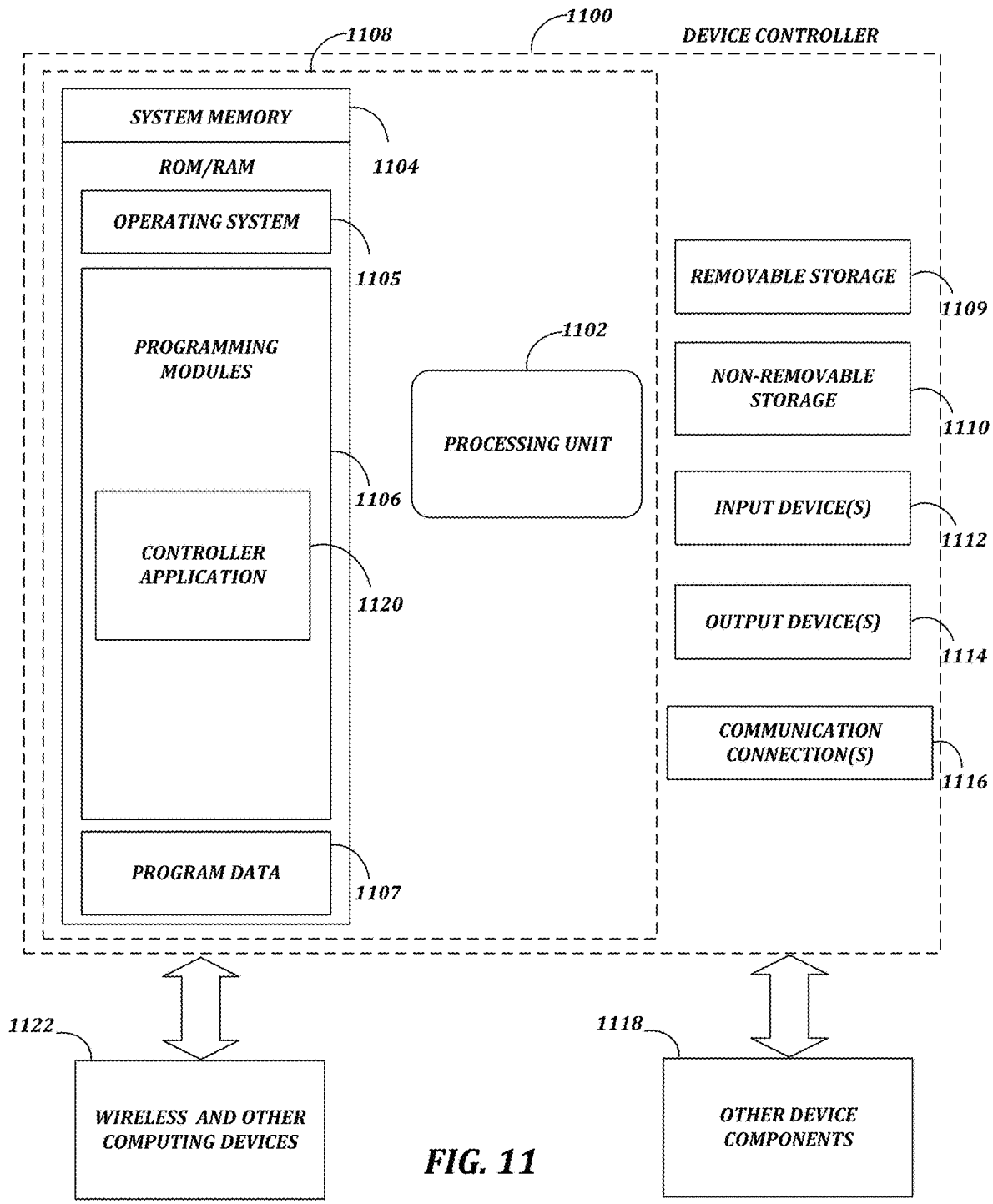
FIG. 11 shows a diagram of a system including a computing device for enabling operation of the disclosed devices in accordance with another exemplary embodiment of the present invention.

FIG. 11 is a flow chart setting forth general stages involved in a method 1000 consistent with an embodiment of the disclosure for operating the disclosed humidifier devices and systems. Method 1000 may be implemented using, at least in part, humidifier system 100 or 200 as described in more detail with respect to FIGS. 1-14. Further, method 1000 may be implemented using, at least in part, a controller 1100 (e.g., on-board computing device) as described in more detail below with respect to FIG. 11. Controller 1100 may comprise a controller for operating the device and device components as well as well as performing other operational tasks, including, but not limited to, humidity and/or airflow control and parameters, thermal control and parameters, and communication. As such, controller 1100 may be in operative configuration and communication with, for example, but not be limited to, vapor source (e.g., actuator), airflow source (e.g., fan), an activating switch, various sensors, communication module, power source, power regulator, transceivers and antennas. As will be detailed with reference to FIG. 11, controller 1100 may comprise a remote communication module to enable remote operation as described herein. In other embodiments, controller 1100 may be completely self-operating upon configuration.

Although stages are disclosed with reference to the humidifier devices and systems in FIGS. 1-10, it should be understood that other disclosed embodiments or components may enable the operation of method 1000, including, but not limited to, other mechanisms, mechanical components, environment properties (e.g., temperature, humidity), user conditions, and the like. Further still, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein.

Method 1000 may begin at starting block 1005 and proceed to stage 1010, where a humidifier system is installed in a room and the output head is positioned into the predefined targeted portion, such as into a crib. From stage 1010, where the output is positioned into the target portion of the room, method 1000 may proceed to stage 1020 where a relative humidity level of the target portion can be determined based at least on sensed humidity data and/or temperature data from the plurality of sensors. From stage 1020, where the relative humidity level of the target portion has been determined, method 1000 may proceed to stage 1030, where vapor production from the vapor source with airflow production from the airflow source can be initiated to output humidified air into the target portion.

From stage 1030, where the humidified air output has begun, method 1000 may proceed to stage 1040, where the vapor amount from the vapor source and/or airflow rate from airflow may be adjusted by the system based at least on real-time or continuous determination of the relative humidity level of the target portion. From stage 1040, where the vapor amount and/or airflow rate are being adjusted, method 1000 may proceed to stage 1050, where vapor production from the vapor source and/or airflow production from the airflow source may be deactivated upon satisfying predetermined humidity criteria in the target portion, such as a target relative humidity level in the range of about 30% to about 60%. After stage 1050, method 1000 may end at stage 1060 or return to step 1020 to determine current RH level. Steps 1020 through 1050 may be repeated until the target relative humidity level is reached or within a desired range. For example, if the target relative humidity level determined during step 1020 falls out of the desired range, method can begin again at step 1030.

In some embodiments, the invention may allow a user to activate the humidifier device and/or humidifying elements in a device remotely from the device. In further aspects, a user does not have to touch the device to: activate its operation, to shut off operation, and/or in embodiments that allow for adjustment, to adjust the humidity level and/or airflow velocity. In still further aspects, a user may activate or de-activate (and/or otherwise control operation of) the vapor source and/or airflow source by using a wireless control unit, such as a wireless device or mobile device that is in operative communication with the vapor source and/or airflow source of the device. The wireless device may be a device that may be used for additional purposes other than use with the invention such as a mobile phone, tablet computer, notebook computer, desktop computer, etc. In some embodiments, the invention may provide a specialized wireless device for dedicated use with the invention. In other embodiments, the specialized wireless device may include other uses if its use is not limited to this particular embodiment of the invention. In other embodiments, the control unit used to control the vapor source and/or airflow source of the device may include an application or application software (an "app") specifically created for such usage. The user may download and/or otherwise obtain the app from sources that supply apps such as independent developers and app stores. The app as used with embodiments of the invention communicates wirelessly, such as by using Bluetooth, Wi-Fi, or the like technology.

In further aspects, controller 1100 (e.g., on-board computing-device) may automatically activate the vapor source and/or airflow source instantly or after a set amount of time has passed since the launch. In other embodiments, activation may occur upon certain reading from on-board sensors (e.g., including, but not limited to, sensors deployed in the device). For example, activation of the vapor source and/or airflow source may be dependent on certain environmental factors and/or user conditions such as, for example, humidity, temperature, respiratory rate, pulse, blood pressure, and the like. Controller 1100 may be configured to trigger activation of various device components upon the satisfaction of certain pre-set conditions. Such conditions may be defined prior to activation.

In various aspects and stages of the disclosed methods, the device may be in operable communication with the user via an antenna or wireless communication component. The user may receive various readings from the various device components and sensors. In some embodiments, the user may control the operation of the vapor source and/or airflow source during use. For example, the user may be able to control the device components, including, but not limited to, the vapor source, airflow source, LCD screen, activating switches or dials, communication module, power source, power regulator, various sensors, transceivers and antennas.

In other embodiments, controller 1100 may be an integrated controller pre-configured with operational control instructions and/or data. In further aspects, the disclosed devices may comprise, but not be limited to, an integrated controller and/or on-board computing module. The computing module may be in operative configuration and communication with, for example, but not be limited to, the vapor source, airflow source, activating switch, communication module, power source, power regulator, various telemetry sensors, transceivers and antennas. Further, the computing module may be in operative communication with another computing device consistent with the description herein, and may comprise, but not be limited to, a wireless device, smart phone, desktop computer, laptop, a tablet, or mobile telecommunications device. Such remote devices may be used to control and/or configure integrated computing module (e.g., activation conditions, humidity operating parameters and settings and the like). Moreover, the device may be in operative communication with a centralized server, such as, for example, a cloud computing service. Although operation has been described to be performed, in part, by a controller 1100, it should be understood that, in some embodiments, different operations may be performed by different networked elements in operative communication with controller 1100.

Embodiments of the present disclosure may comprise a system having a memory storage and a processing unit. The processing unit may be coupled to the memory storage, wherein the processing unit is configured to perform the stages of method 1000. FIG. 11 is a block diagram of a system including controller 1100. Consistent with an embodiment of the disclosure, the aforementioned memory storage and processing unit may be implemented in a computing device, such as controller 1100. Any suitable combination of hardware, software, or firmware may be used to implement the memory storage and processing unit. For example, the memory storage and processing unit may be implemented with controller 1100 or any of the vapor source, airflow source, sensors, and device components 1118, or any other control unit and wireless devices 1122, in combination with controller 1100. Other device components 1118 may comprise, for example, but not be limited to, control mechanisms, vapor source, airflow source, sensors, switches, communication module, power source, power regulator, various transceivers and antennas. The aforementioned system, device, and processors are examples and other systems, devices, and processors may comprise the aforementioned memory storage and processing unit, consistent with embodiments of the disclosure.

With reference to FIG. 11, a system consistent with an embodiment of the disclosure may include a computing device, such as controller 1100. In a basic configuration, controller 1100 may include at least one processing unit 1102 and a system memory 1104. Depending on the configuration and type of computing device, system memory 1104 may comprise, but is not limited to, volatile (e.g., random access memory (RAM)), non-volatile (e.g., read-only memory (ROM)), flash memory, or any combination. System memory 1104 may include operating system 1105, one or more programming modules 1106, and may include a program data 1107. Operating system 1105, for example, may be suitable for controlling controller 1100's operation. In one embodiment, programming modules 1106 may include controller application ("app") 1120. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. In further aspects, the app may provide a user with information as well as be the user's interface to operating the embodiment of the invention. The app may include one or more graphic user interfaces (GUIs). Among the GUIs of the app may be a GUI allowing the user to pick which, if there is more than one, vapor source and/or airflow source to activate, and to select (if available) one or more operating parameters or characteristics (such as amplitude, frequency, air flow velocity, and/or temperature) of the vapor source and/or airflow source of the device. The user may be able to adjust such selections without having to deactivate the embodiment from a GUI of the app. The user may also use the app to turn on and turn off the device components. The GUI may include additional or other information relating to the water vapor being generated by the actuator such as the strength (amplitude) or frequency (speed) of the actuator, or relating to the humidity or velocity of air being output by the device. The additional or other information may be color coded and/or otherwise presented so as to be readily understood by the user by looking at the GUI of the app. The app may also present the user with information received from the device components, such as environmental and telemetry data from the sensors. In some embodiments, the GUI may be presented on an LCD screen integrated in the device housing.

Controller 1100 may have additional features or functionality. For example, controller 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by controller 1100. Any such computer storage media may be part of device 1100. Controller 1100 may also be operative with input device(s) 1112 such as a keyboard, a mouse, a pen, a sound input device, a touch input device (e.g., an integrated LCD screen), etc. Input device(s) 1112 may be used to, for example, manually access and program controller 1100. Output device(s) 1114 such as a display, speakers, a printer, etc. may also be included. The aforementioned devices are examples and others may be used.

Controller 1100 may also contain a communication connection 1116 that may allow device 1100 to communicate with other control units and wireless devices 1122 as well as vibration source, thermal elements, and other components 1118 (e.g., transceivers, sensors, thermal elements), such as over an encrypted network in a distributed computing environment. Communication connection 1116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, Bluetooth, radio frequency (RF), infrared, and other wireless media. The term computer readable media as used herein may include both storage media and communication media. As stated above, a number of program modules and data files may be stored in system memory 1104, including operating system 1105. While executing on processing unit 1102, programming modules 1106 (e.g., controller application 1120) may perform processes including, for example, one or more of stages or portions of stages of method 1000 as described above. App 1120 may be configured to operate device components 1118 and receive instructions from, for example, communications connections module 1116. The aforementioned process is an example, and processing unit 1102 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Also disclosed herein are kits comprising the disclosed modular humidifier device and system. For example, in an exemplary aspect, the present disclosure provides a humidifier kit for cribs comprising: a disclosed humidifier device or system.

E. Examples

The following example is put forth so as to provide those of ordinary skill in the art with a complete disclosure and description of how the articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for.

The Example is provided herein to illustrate the invention, and should not be construed as limiting the invention in any way. Examples are provided herein to illustrate the invention and should not be construed as limiting the invention in any way.

1. Device Control of Humidity of a Target Microenvironment in a Defined Test Macroenvironment In this example, a humidity device according to the present invention was evaluated to evaluate effectiveness of controlling humidity of a target microenvironment in a defined environment area or macroenvironment.

Figure 12A:
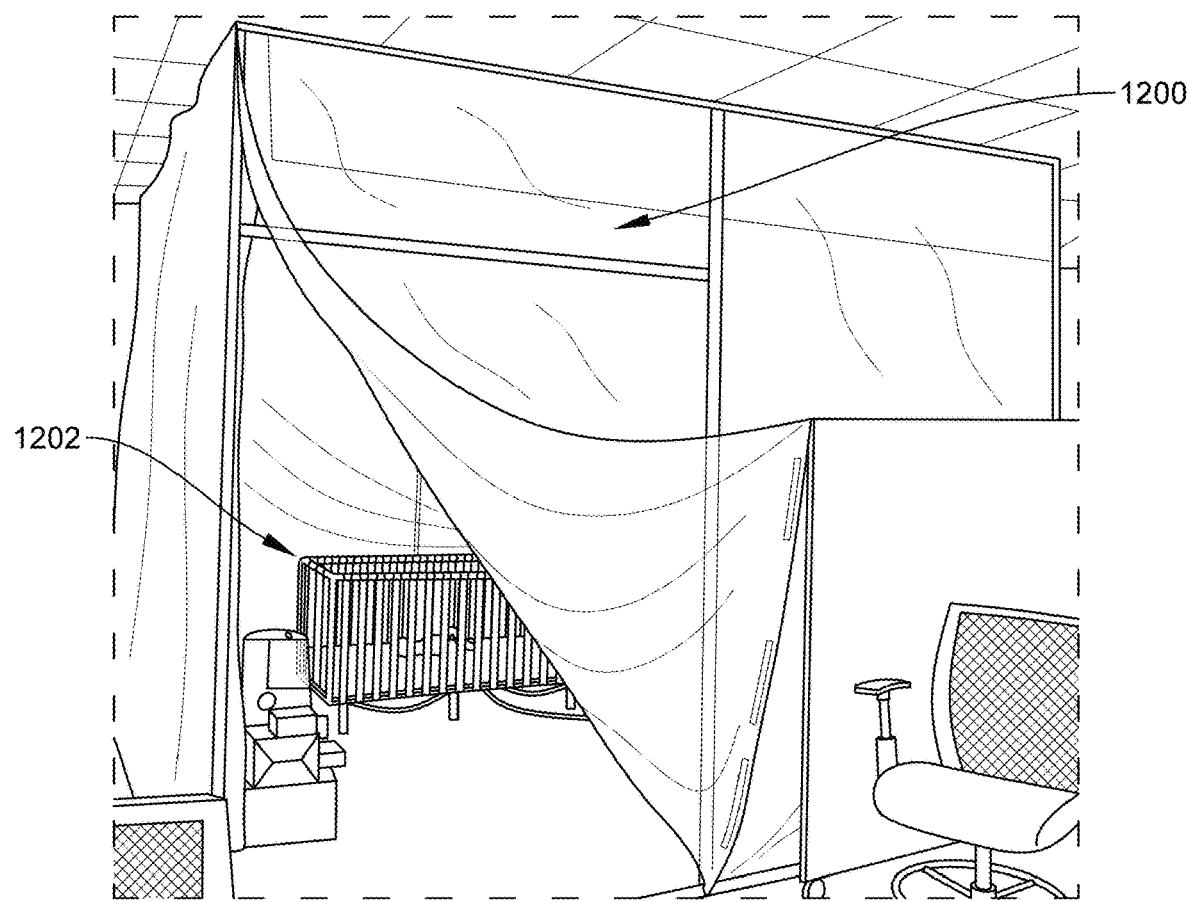
FIGS. 12A-12B shows depictions of a humidifier device in a test environment with embodiments of the present disclosure.
Figure 12B:
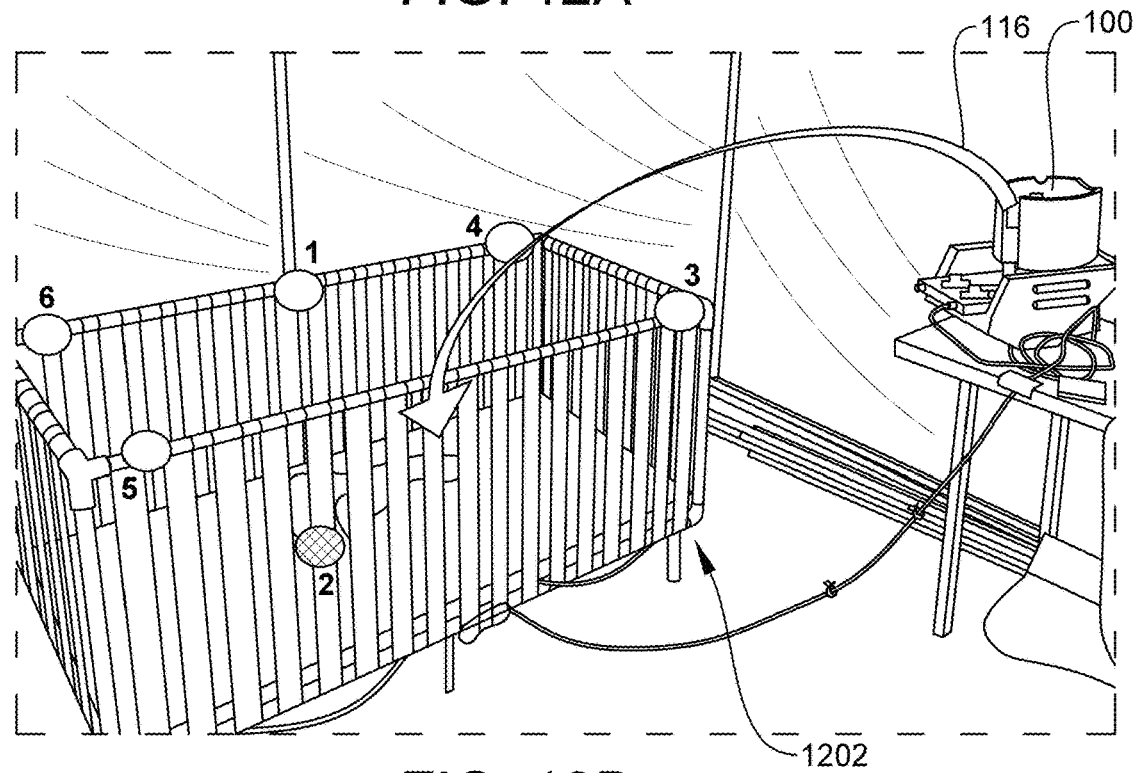

The general study methods of study were as follows:

As shown in FIGS. 12A-12B, a test macroenvironment 1200 was created and humidity device 100 along with a crib representing the target microenvironment 1202 was placed within test macroenvironment. Humidity device 100 was operated and evaluated to demonstrate that that the humidity at the target location point (2) could be effectively controlled by the humidity device using only data from the humidity's sensors in the test macroenvironment. The humidity level at the target location point (2) and of various points (1, 3-6) just outside the target location were measured to evaluate the ability of the humidity device to control the precise target location and to evaluate the accuracy of the humidity device's estimated relative humidity during operation.

The distance between the humidity machine and the target location was inputted into the control unit of the humidity device, and the water vapor output axis was aimed at the target location. The humidity device was then operated and the humidity level the target location point (2) and various points (1, 3-6) were measured and compared to the relative humidity level determined by the humidity device using the sensor data from the two sensors on the device housing. The data show that the humidity device's control strategy and parabolic arc output flow path of water vapor was effective in precisely controlling the target location point (2) humidity level to the desired humidity level with without having the same humidity level changes in the various points (1, 3-6) just outside the target location. The data also show that the humidity device was able to accurately calculate relative humidity level at the target location (2) with the only sensed environment data utilized from the humidity device's sensors located behind the water vapor output location. In other embodiments, the desired humidity level (or range) at the target location may be inputted into the control unit for automatic and continuous control of humidity of the target location microenvironment.

The present invention encompasses at least the following aspects: Aspect 1: A humidifier device for controlling a microclimate in a predefined target microenvironment comprising a portion of a predefined space, the humidifier device comprising: a humidity unit comprising: a vapor source configured to produce water vapor or moisture, and an airflow source configured to produce airflow; a plurality of sensors, at least one sensor of the plurality of sensors configured to measure at least one of absolute humidity data or temperature data; a control unit in operative communication with the humidity unit for controlling operation of the humidity unit; a housing for containing the humidity unit, a plurality of sensors, and control unit; and a tank configured to removably couple with the housing, the tank configured to contain a fluid for producing moisture or water vapor; wherein the humidifier device is configured to produce humidified air using the moisture source and airflow source; wherein the humidified air is configured to control relative humidity in the predetermined portion, the humidified air configured to travel in a predetermined flow path along an output axis.

Aspect 2: A system for controlling a microclimate in a predefined target microenvironment portion of a predefined space, the system comprising: a humidifier device comprising: a humidity unit comprising a vapor source configured to produce water vapor or moisture, and an airflow source configured to produce airflow, the humidity unit configured to produce humidified air, using the vapor source and airflow source, for controlling relative humidity in the predetermined portion, the humidified air configured to travel in a predetermined flow path along an output axis; a plurality of sensors, each sensor configured to measure absolute humidity data and/or temperature data; a control unit in operative communication with the humidity unit for controlling operation of the humidity unit; a housing for containing the humidity unit, a plurality of sensors, and control unit; and a tank configured to removably couple with the housing, the tank configured to contain a fluid for producing moisture or water vapor.

Aspect 3: The system or device of any preceding aspect, wherein the predefined microenvironment portion is a defined microenvironment having a microclimate. Aspect 4: The system or device of any preceding aspect, wherein the predefined portion is a defined microenvironment volume having a microclimate located within the predefined space. Aspect 5: The system or device of any preceding aspect, further comprising a pump in fluid communication between the vapor source and the tank. Aspect 6: The system or device of any preceding aspect, wherein the pump configured to move the fluid from the tank to the vapor source and from the vapor source to the tank. Aspect 7: The system or device of any preceding aspect, wherein the pump is configured to transport a predetermined amount of fluid to the vapor source. Aspect 8: The system or device of any preceding aspect, wherein the pump is configured to transport a predetermined amount of fluid to the vapor source corresponding to the amount of desired water vapor production. Aspect 9: The system or device of any preceding aspect, wherein the pump is configured to transport excess fluid from the vapor source back to the tank. Aspect 10: The system or device of any preceding aspect, wherein the pump is configured to transport fluid from the vapor source back to the tank when the vapor source is off. Aspect 11: The system or device of any preceding aspect, wherein the pump is configured to remove standing fluid from the vapor source back to the tank when the vapor source is not producing water vapor. Aspect 12: The system or device of any preceding aspect, wherein the pump is a peristaltic pump. Aspect 13: The system or device of any preceding aspect, further comprising a fluid level sensor configured to determine a volume of fluid in the vapor source. Aspect 14: The system or device of any preceding aspect, wherein the fluid level sensor is configured to determine if a sufficient volume of fluid is present in the vapor source effective to allow a predetermined volume of water vapor production. Aspect 15: The system or device of any preceding aspect, wherein the fluid level sensor and pump cooperate to transport fluid between the vapor source and the tank. Aspect 16: The system or device of any preceding aspect, wherein the fluid level sensor and pump cooperate to transport fluid from the vapor source back to the tank when the vapor source is off or not producing water vapor. Aspect 17: The system or device of any preceding aspect, wherein the fluid level sensor and pump cooperate to transport fluid from the vapor source back to the tank when the vapor source is off. Aspect 18: The system or device of any preceding aspect, wherein the fluid level sensor is configured to prevent the pump from overflowing the vapor source with fluid. Aspect 19: The system or device of any preceding aspect, wherein the fluid level sensor comprises a plurality of wire probes behind the transducer connected by a resistor ladder and a de-noising capacitor.

Aspect 20: The system or device of any preceding aspect, further comprising a tank switch configured to determine an installation status of the tank. Aspect 21: The system or device of any preceding aspect, wherein the tank switch comprises a pushbutton switch with a roller arm that is deflected upon full insertion of the tank into the machine. Aspect 22: The system or device of any preceding aspect, wherein at least two sensors are located at different, predetermined positions. Aspect 23: The system or device of any preceding aspect, wherein at least two sensors are located at different, predetermined positions along a shared plane. Aspect 24: The system or device of any preceding aspect, wherein at least two sensors are located at different, predetermined positions along a shared plane behind the output axis. Aspect 25: The system or device of any preceding aspect, further comprising at least one remote sensor remotely located from the housing. Aspect 26: The system or device of any preceding aspect, further comprising at least one additional sensor selected from one or more of: a boost rail voltage sensor, transducer sine wave amplitude sensor, or fan current sensor, or combinations thereof. Aspect 27: The system or device of any preceding aspect, wherein the vapor source is in operable communication with fluid in the tank. Aspect 28: The system or device of any preceding aspect, wherein the vapor source is configured to atomize the fluid from the tank. Aspect 29: The system or device of any preceding aspect, wherein the vapor source is configured to produce water vapor without requiring a standing pool of fluid. Aspect 30: The system or device of any preceding aspect, wherein the vapor source and a fluid source used to produce water vapor are in separate locations. Aspect 31: The system or device of any preceding aspect, wherein the vapor source comprises an actuator or transducer, or a combination thereof. Aspect 32: The system or device of any preceding aspect, wherein the vapor source comprises transducer configured to produce a fine mist from a fluid. Aspect 33: The system or device of any preceding aspect, wherein the vapor source comprises transducer configured to produce a fine mist without a standing pool of fluid. Aspect 34: The system or device of any preceding aspect, wherein the vapor source comprises transducer configured to produce a fine mist without being submerged in a standing pool of fluid. Aspect 35: The system or device of any preceding aspect, wherein the vapor source comprises a mesh transducer. Aspect 36: The system or device of any preceding aspect, wherein the mesh transducer comprises a mesh disk. Aspect 37: The system or device of any preceding aspect, wherein the mesh transducer comprises a piezoelectric ceramic mesh disk. Aspect 38: The system or device of any preceding aspect, wherein the mesh disk is capable of temporarily deforming in a direction when a voltage is placed across it. Aspect 39: The system or device of any preceding aspect, wherein the mesh disk comprises holes configured to create fine droplets using the fluid from the tank. Aspect 40: The system or device of any preceding aspect, wherein the mesh disk comprises from about 6 to about 15 um holes configured to create fine droplets using the fluid from the tank. Aspect 41: The system or device of any preceding aspect, wherein the holes are from about 1 to about 40 μm. Aspect 42: The system or device of any preceding aspect, wherein the holes are from about 6 to about 15 μm. Aspect 43: The system or device of any preceding aspect, wherein the holes are from about 8 to about 18 μm. Aspect 44: The system or device of any preceding aspect, wherein the holes are from about 18 to about 30 μm. Aspect 45: The system or device of any preceding aspect, wherein the piezoelectric ceramic mesh disk is configured to produce oscillations from periodic oscillating wave input effective to cause droplets of the fluid to be propelled into the air. Aspect 46: The system or device of any preceding aspect, wherein the piezoelectric ceramic mesh disk is configured to produce oscillations from sine wave input effective to cause droplets of the fluid to be propelled into the air. Aspect 47: The system or device of any preceding aspect, wherein the actuator uses a variable amplitude, fixed frequency, variable amplitude, frequency, or duty cycle or the like waveform. Aspect 48: The system or device of any preceding aspect, wherein the mesh transducer is configured to be placed between the fluid in the tank and the air outside. Aspect 49: The system or device of any preceding aspect, wherein vapor source arrangement is configured to eliminate of standing water anywhere in the machine except for the tank, which will prevent mold buildup.

Aspect 50: The system or device of any preceding aspect, wherein the airflow source is capable of producing an airflow effective to propel or move water vapor at a predetermined velocity along a predetermined flow path. Aspect 51: The system or device of any preceding aspect, wherein the flow path comprises a parabolic arc. Aspect 52: The system or device of any preceding aspect, wherein the airflow source is a DC fan. Aspect 53: The system or device of any preceding aspect, wherein the microclimate is humidity. Aspect 54: The system or device of any preceding aspect, wherein the predefined microenvironment portion is a crib. Aspect 55: The system or device of any preceding aspect, wherein a fixed target distance to the predefined portion is measured or determined based at least on data associated with one or more sensors. Aspect 56: The system or device of any preceding aspect, wherein a fixed target distance to the predefined portion is measured or determined based at least on data associated with at least two sensors. Aspect 57: The system or device of any preceding aspect, wherein a relative humidity level of a target predefined portion is determined using artificial intelligence (AI), machine learning techniques, predictive modeling and/or algorithms. Aspect 58: The system or device of any preceding aspect, wherein the sensor is configured to measure humidity data and temperature data. Aspect 59: The system or device of any preceding aspect, wherein the measured humidity data and temperature data are used to determine a relative humidity (RH) level. Aspect 60: The system or device of any preceding aspect, wherein the measured humidity data and temperature data further comprise using a low pass filter. Aspect 61: The system or device of any preceding aspect, wherein the determined relative humidity (RH) level comprises an average of the measured humidity data and temperature data from the plurality of sensors. Aspect 62: The system or device of any preceding aspect, wherein the plurality of sensors is in operable communication with the control unit. Aspect 63: The system or device of any preceding aspect, wherein the system is configured to sense a plurality of humidity data and temperature data at a plurality of points. Aspect 64: The system or device of any preceding aspect, wherein the plurality of sensors comprises a first sensor and a second sensor. Aspect 65: The system or device of any preceding aspect, wherein the system is configured to sense relative humidity levels at two different points. Aspect 66: The system or device of any preceding aspect, wherein the system is configured to sense relative humidity levels at two different points using the first and second sensors. Aspect 67: The system or device of any preceding aspect, wherein controlling operation of the humidity source is based at least on absolute humidity data and/or temperature data from the plurality of sensors. Aspect 68: The system or device of any preceding aspect, wherein the control unit is in operative communication with the humidity unit for controlling operation of the humidity unit. Aspect 69: The system or device of any preceding aspect, wherein the control unit is in operative communication with the vapor source and/or airflow source for controlling operation of the vapor source or airflow source, or a combination thereof. Aspect 70: The system or device of any preceding aspect, wherein controlling operation of the vapor source and/or airflow source is based at least on absolute humidity data and/or temperature data from the plurality of sensors. Aspect 71: The system or device of any preceding aspect, wherein the control unit comprises a microcontroller. Aspect 72: The system or device of any preceding aspect, wherein the control unit comprises a proportional integral controller with anti-windup consideration. Aspect 73: The system or device of any preceding aspect, wherein the control unit is configured. Aspect 74: The system or device of any preceding aspect, wherein the system is configured to use sensed RH values and a preprogrammed knowledge base to estimate a RH level in the predetermined portion of a predefined space. Aspect 75: The system or device of any preceding aspect, wherein the system is configured to use sensed RH values and a preprogrammed knowledge of at least one of: a distance between one or more sensors, a distance between one or more sensors and the fixed target, or a fixed target distance to estimate a RH level in the predetermined portion of a predefined space. Aspect 76: The system or device of any preceding aspect, wherein the system is configured to use two sensed RH values and a preprogrammed knowledge of the distance between the first and second sensors along with a fixed target distance to estimate a RH level in the predefined portion of the predefined space. Aspect 77: The system or device of any preceding aspect, wherein a target distance is determined using sensor positional data measured by Bluetooth or RF. Aspect 78: The system or device of any preceding aspect, wherein the system is configured to use the estimated RH level in the predetermined portion of the predefined space for controlling the humidity unit. Aspect 79: The system or device of any preceding aspect, wherein the system is configured to use the estimated RH level in the predetermined portion of the predefined space for controlling the rate of humidity output. Aspect 80: The system or device of any preceding aspect, wherein the system is configured to use the estimated RH level in the predefined portion of the predefined space for controlling the amount of vapor/moisture and/or airflow rate of the humidified air outputted from the humidity unit. Aspect 81: The system or device of any preceding aspect, wherein the relative humidity level and/or target distance is determined using artificial intelligence (AI), machine learning techniques, predictive modeling and/or algorithms. Aspect 82: The system or device of any preceding aspect, wherein the system is configured to are able to use water more efficiently, yielding a longer runtime for the same tank capacity, and able to avoid the negative effects of humidity levels being too high or too low, propensity to mold growth in the room and respiratory discomfort respectively. Aspect 83: The system or device of any preceding aspect, wherein the housing comprises a rotating output head configured to control an output direction of the humidified air. Aspect 84: The system or device of any preceding aspect, wherein the output direction of the humidified air corresponds to the output axis. Aspect 85: The system or device of any preceding aspect, wherein the output head is configured to be rotated about an axis by a user to control the output direction. Aspect 86: The system or device of any preceding aspect, wherein the housing comprises an output shaft configured to carry the humidified air along the predetermined flow path. Aspect 87: The system or device of any preceding aspect, wherein the output shaft is connected to the output head. Aspect 88: The system or device of any preceding aspect, wherein the output shaft comprises an access door for easy access. Aspect 89: The system or device of any preceding aspect, wherein the output shaft comprises an access door on the front which can be opened so the output shaft can be accessed more easily for cleaning. Aspect 90: The system or device of any preceding aspect, wherein the tank is removable and dishwasher safe. Aspect 91: The system or device of any preceding aspect, wherein the tank does not comprise small, hard to reach, crevasses. Aspect 92: The system or device of any preceding aspect, wherein the tank is made from a non-opaque material, so that the user can visually verify the water level. Aspect 93: The system or device of any preceding aspect, wherein the device comprises a tank interfacing component configured to fix the tank in place such that no water leaks until the user removes it. Aspect 94: The system or device of any preceding aspect, wherein the system or device is configured to position the transducer within the tank on a boundary of the fluid and free air. Aspect 95: The system or device of any preceding aspect, wherein the predefined target microenvironment or portion is a portion of a space having a defined volume. Aspect 96: The system or device of any preceding aspect, wherein the predefined target microenvironment or portion has a volume smaller that a volume of the space. Aspect 97: The system or device of any preceding aspect, wherein the predefined target microenvironment or portion of the predefined area is a crib. Aspect 98: The system or device of any preceding aspect, wherein system or device is effective to create a microclimate within the predefined portion of the predefined space. Aspect 99: The system or device of any preceding aspect, wherein system or device is effective to create a microclimate within a crib located in nursery or room.

Aspect 100: A method of controlling humidity or microclimate within in a predefined target microenvironment comprising a portion of a predefined space, the method comprising the steps of: a) positioning output from a humidifier device or system or device of any preceding aspect towards the predefined target microenvironment within the predefined space; b) determining a relative humidity level of the target portion based at least on sensed humidity data and/or temperature data from the plurality of sensors in the humidifier device; c) activating vapor production from the vapor source and air flow production from the airflow source to output humidified air into the target microenvironment according to the predefined flow path; d) adjusting an amount of vapor production from the vapor source and/or airflow rate from the air source based at least on the determined relative humidity level of the target microenvironment; and e) deactivating vapor production from the vapor source and/or airflow production from the air source upon satisfying a predetermined humidity criteria in the target microenvironment. Aspect 101: The method of any preceding aspect, wherein the relative humidity level of the target microenvironment is based at least on two sensed RH values and a preprogrammed knowledge of the distance between first and second sensors along with a fixed target distance to the predefined target portion. Aspect 102: The method of any preceding aspect, wherein the predetermined humidity criteria is a relative humidity level in the range of about 30% to about 60%. Aspect 103: The method of any preceding aspect, wherein the fixed target distance is measured or determined by the system based at least on data associated with one or more sensors. Aspect 104: The method of any preceding aspect, wherein the fixed target distance is inputted into the device by a user. Aspect 105: The method of any preceding aspect, wherein the relative humidity level of the target portion is determined using artificial intelligence (AI), machine learning techniques, predictive modeling and/or algorithms. Aspect 106: The method of any preceding aspect, wherein the vapor production volume, vapor production duration, airflow duration. and/or airflow rate is determined using artificial intelligence (AI), machine learning techniques, predictive modeling and/or algorithms. Aspect 107: The method of any preceding aspect, wherein vapor production and airflow production is controlled by the control unit using a disclosed control strategy.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A humidifier device for controlling a microclimate in a predefined target microenvironment comprising a portion of a predefined space, the humidifier device comprising:
    a humidity unit comprising:
        a vapor source configured to produce water vapor or moisture, and
        an airflow source configured to produce airflow;
    a plurality of sensors, at least one sensor of the plurality of sensors configured to measure at least one of absolute humidity data or temperature data;
    a control unit in operative communication with the humidity unit for controlling operation of the humidity unit, wherein the control unit is configured to determine a relative humidity at the predefined target microenvironment disposed at a known distance from the humidifier device based at least in part on the sensor readings and a speed of the airflow source, and wherein the control unit is configured to control the humidity unit based on the determined relative humidity at the predefined target microenvironment;
    a housing for containing the humidity unit, the plurality of sensors, and the control unit; and
    a tank configured to removably couple with the housing, the tank configured to contain a fluid for producing moisture or water vapor;
    wherein the humidifier device is configured to produce humidified air using the vapor source and airflow source; wherein the humidified air is configured to control relative humidity in the predefined target microenvironment, the humidified air configured to travel in a predetermined flow path along an output axis.

2. A system for controlling a microclimate in a predefined target microenvironment portion of a predefined space, the system comprising:
    the humidifier device of claim 1, wherein
    each sensor, of the plurality of sensors, is configured to measure at least one of absolute humidity data or temperature data;
    wherein the control unit is in operative communication with the humidity unit and the plurality of sensors to control operation of the humidity unit; and
    wherein the housing includes a rotatable output head configured to control an output direction of the humidified air.

3. The system of claim 2, further comprising a pump in fluid communication between the vapor source and the tank, the pump being configured to continuously circulate water along a circuit comprising the vapor source and the tank.

4. The system of claim 3, wherein the vapor source is configured to atomize the fluid from the tank.

5. The system of claim 4, wherein the vapor source comprises a transducer configured to produce a fine mist without being submerged in a standing pool of fluid.

6. The system of claim 5, wherein the vapor source is configured to eliminate standing water anywhere in the system except for the tank.

7. The system of claim 2, wherein at least two sensors, of the plurality of sensors, are located at different, predetermined positions along a shared plane behind an output location of the vapor source.

8. The system of claim 2, further comprising at least one remote sensor remotely located from the housing.

9. The system of claim 2, further comprising at least one additional sensor selected from one or more of: a boost rail voltage sensor, transducer sine wave amplitude sensor, or fan current sensor, or combinations thereof.

10. The system of claim 2, wherein the airflow source is configured to produce an airflow effective to move water vapor at a predetermined velocity along a predetermined flow path.

11. The system of claim 2, wherein the absolute humidity data and the temperature data measured by the plurality of sensors are used to determine a relative humidity (RH) level.

12. The system of claim 11, wherein the system is configured to use the determined-RH level and a preprogrammed knowledge base to estimate a RH level in the predefined target microenvironment portion of the predefined space.

13. The system of claim 12, wherein the system is configured to use the estimated RH level in the predefined target microenvironment portion of the predefined space for controlling the humidity unit.

14. The system of claim 2, wherein controlling operation of the humidity unit is based at least on absolute humidity data and/or temperature data from the plurality of sensors.

15. The system of claim 2, wherein the control unit is in operative communication with the vapor source and the airflow source, and wherein controlling operation of the humidity unit comprises controlling operation of one or more of the vapor source or the airflow source.

16. The system of claim 2, wherein the predefined target microenvironment portion of the predefined space has a volume smaller that a volume of the predefined space.

17. The system of claim 2, wherein determining the relative humidity at the predefined target microenvironment comprises estimating the relative humidity at the microenvironment based on a relative humidity measured at the humidifier device.

18. The system of claim 2, wherein determining the relative humidity at the predefined target microenvironment comprises measuring the relative humidity at the microenvironment using a humidity sensor.

19. The system of claim 18, wherein the humidity sensor is remote from the humidifier device, and is configured to communicate wirelessly with the humidifier device.

20. A method of controlling humidity or microclimate within in a predefined target microenvironment comprising a portion of a predefined space using the humidifier device of claim 1, the method comprising the steps of:

positioning output from the humidifier device towards the predefined target microenvironment portion of the predefined space;

determining a relative humidity level of the target microenvironment portion of the predefined space based at least on sensed humidity data or temperature data from the plurality of sensors in the humidifier device;

activating vapor production from the vapor source of the humidifier device and air flow production from the airflow source of the humidifier device to output humidified air into the target microenvironment portion of the predefined space according to the predetermined flow path;

adjusting one or more of an amount of vapor production from the vapor source or an airflow rate from the airflow source based at least on the determined relative humidity level of the predefined target microenvironment; and deactivating one or more of vapor production from the vapor source or airflow production from the air source in response to satisfying a predetermined humidity criteria in the target microenvironment portion of the predefined space.

* * * * *